US007127700B2

(12) United States Patent
Large

(10) Patent No.: US 7,127,700 B2
(45) Date of Patent: Oct. 24, 2006

(54) METHOD AND APPARATUS FOR DEVELOPING WEB SERVICES USING STANDARD LOGICAL INTERFACES TO SUPPORT MULTIPLE MARKUP LANGUAGES

(75) Inventor: Andrew R. Large, La Selva Beach, CA (US)

(73) Assignee: Openwave Systems Inc., Redwood City, CA (US)

( * ) Notice: Subject to any disclaimer, the term of this patent is extended or adjusted under 35 U.S.C. 154(b) by 580 days.

(21) Appl. No.: 10/251,515

(22) Filed: Sep. 19, 2002

(65) Prior Publication Data

US 2003/0182624 A1 Sep. 25, 2003

Related U.S. Application Data

(60) Provisional application No. 60/364,862, filed on Mar. 14, 2002, provisional application No. 60/364,480, filed on Mar. 14, 2002.

(51) Int. Cl.
*G06F 9/44* (2006.01)
*G06F 9/45* (2006.01)
(52) U.S. Cl. .................. 717/100; 717/102; 717/120
(58) Field of Classification Search ........ 717/100–114, 717/120–123; 709/203
See application file for complete search history.

(56) References Cited

U.S. PATENT DOCUMENTS

| | | | | |
|---|---|---|---|---|
| 5,870,550 A | * | 2/1999 | Wesinger et al. | 709/218 |
| 6,035,119 A | * | 3/2000 | Massena et al. | 717/100 |
| 6,601,232 B1 | * | 7/2003 | Burba et al. | 717/100 |
| 6,601,233 B1 | * | 7/2003 | Underwood | 717/102 |
| 6,625,803 B1 | * | 9/2003 | Massena et al. | 717/100 |
| 6,626,957 B1 | * | 9/2003 | Lippert et al. | 715/513 |
| 6,647,422 B1 | * | 11/2003 | Wesinger et al. | 709/228 |
| 6,684,388 B1 | * | 1/2004 | Gupta et al. | 717/136 |
| 6,701,514 B1 | * | 3/2004 | Haswell et al. | 717/115 |
| 6,718,535 B1 | * | 4/2004 | Underwood | 717/101 |
| 7,003,759 B1 | * | 2/2006 | Jameson | 717/120 |
| 7,017,147 B1 | * | 3/2006 | Hayase et al. | 717/108 |
| 2003/0182364 A1 | | 9/2003 | Large et al. | |

OTHER PUBLICATIONS

Renear et al, "Towards a semantics for XML Markup", ACM DOCENG, pp. 119-126, 2002.*
Vuong et al, Managing security policies in distributed environment uing extensible markup language (XML) ACM SAC, pp. 405-411, 2001.*
Bayeri et al, "Methods for the semantic analysis of document markup", ACM DOCENG, pp. 161-170, 2003.*
Li et al, "Composing XSL transformations with XML publishing views", ACM SIGMOD, pp. 515-526, 2003.*

* cited by examiner

*Primary Examiner*—Anil Khatri
(74) *Attorney, Agent, or Firm*—Blakely, Sokoloff, Taylor & Zafman, LLP

(57) ABSTRACT

The Web Services Development Kit (WSDK) comprises a set of build-time tools and run-time components designed to support the development of web services and the interface to those services. WSDK provides a framework for the development of web services that isolates developers from the implementation details of the markup and transport layers, by separating the logical aspects of the service development from the physical aspects. A "call" generated by a client contains a batch of operations to be executed in the context of a single request/reply message exchange. A markup library translates logical structure to a specific markup language. Additional markup languages are supported by adding additional modules to the markup library.

29 Claims, 12 Drawing Sheets

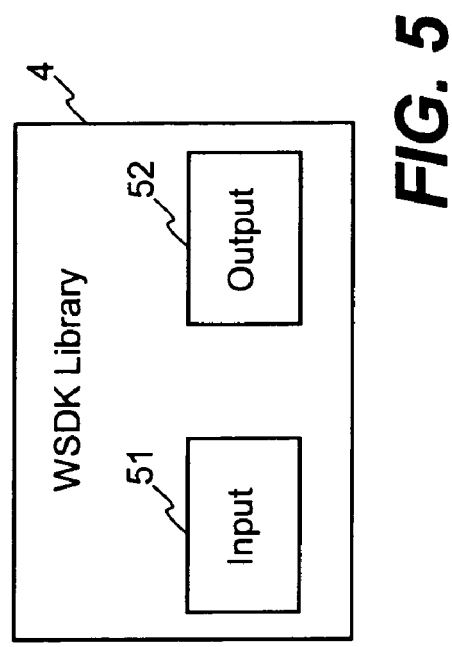

METHOD AND APPARATUS FOR DEVELOPING WEB SERVICES USING STANDARD LOGICAL INTERFACES TO SUPPORT MULTIPLE MARKUP LANGUAGES

This application claims the benefit of U.S. Provisional patent application No. 60/364,480 filed on Mar. 14, 2002 and U.S. Provisional patent application No. 60/364,862 filed on Mar. 14, 2002, which are incorporated herein by reference.

FIELD OF THE INVENTION

At least one embodiment of the present invention pertains to tools and components for the development of web services and, more particularly, to a method and apparatus for developing web services that employ a standard logical interface to support multiple markup implementations.

BACKGROUND

"Web services" is an industry term that covers a collection of standards and proposals that define how distributed computing should be implemented in a web-based network environment, such as the World Wide Web. Web services is an evolving area of technology that has a broad range of potential applications but is immature in implementation. There are several general attributes that describe the essence of web services.

The primary paradigm for web services is that of a client/server relationship. A client sends a request to a server for the execution of some task. The server executes the task and sends an appropriate reply back to the client.

Interoperability is a main goal of current web services efforts. Applying lessons from past mistakes, the industry is focusing its efforts on ensuring that information communicated between components of the system will be interpreted identically by all of the parties involved. The focus on "on the wire" representation has allowed for the development of very different (and competing) technologies for constructing web service implementations. Two of the major contenders at present include Microsoft, with its .NET architecture that leverages its traditional COM technology, and IBM, with its WebSphere architecture that leverages such Java technologies as Java 2 Enterprise Edition (J2EE).

Communication between client and server on the World Wide Web is typically accomplished via Hypertext Transport Protocol (HTTP). This is one of the factors that distinguish web services from other client/server approaches, such as remote procedure call (RPC) or common object request broker architecture (CORBA). Web service interactions also differ from those of typical Web browser interactions. In the typical browser interaction, the client sends a request for content from the server which will be rendered for display to an end user. In the web services model, the client sends a request for a task (or operation) to be executed by the server, and the reply contains the results of executing that operation.

Underlying most aspects of web services is the extensible markup language (XML). Most situations that call for representation of data employ XML as the base data structuring language. Most web services protocols are defined as a set of XML elements and conventions. This is another major factor that distinguishes web services from other client/server approaches. For example, CORBA employs one language (IDL) for defining interfaces and a different protocol (IIOP) for communicating between client and server. In the web services context, both the interface definition language and the client/server communication protocol are represented in XML.

There are two problems with XML, however, that probably originate from its original focus on supporting text processing. First, XML can be quite difficult and expensive to parse, due to such features as user-defined entities, processing instructions, etc., most of which are not needed for most inter-application communication. Second, as a text-based protocol, XML does not support the transport of raw binary information. Instead, it must be encoded into text for transmission (e.g., Base64 or similar encoding mechanisms).

There are essentially two approaches typically used for solving the first problem. The first approach is to define protocols that are based on the important core features of XML, but specifically forbid the use of particularly complex XML features (such as processing instructions). A recent example of this approach is the Simple Object Access Protocol (SOAP). See "Simple Object Access Protocol (SOAP) 1.1," W3C Note, May 8, 2000. SOAP is an XML-based protocol that provides basic rules for the format of request and reply messages exchanged between client and server during operation execution. The second approach is to define a separate "logical" document model and then provide information to "map" that logical model onto the specific XML representation. A recent example of this approach is the Web Services Description Language (WSDL). See "Web Services Description Language (WSDL) 1.1," W3C Note, Mar. 15, 2001. WSDL is an XML-based interface definition language that is used to define the operations supported by a server and how requests and replies for those operations are represented in the messages exchanged between client and server.

SOAP defines four basic things:
1) A subset of XML grammar that is allowed in a SOAP message (basically, it disallows certain complex XML constructs that are difficult to parse and are not applicable to a remote method invocation paradigm);
2) A basic document structure for SOAP messages that include:
    a top level SOAP "Envelope" element within which all SOAP-related XML data must reside,
    a SOAP "Header" element which is intended to contain all information pertaining to routing and handling of the SOAP document, and
    a SOAP "Body" element which is intended to contain all information pertaining to execution of the specific request (or reply);
3) How "faults" (document processing or task execution errors) should be represented within the document; and
4) A suggested approach for representing typed data in SOAP documents (e.g., mappings from low-level host programming language variable types to XML).

WSDL defines a grammar for describing web service interfaces. A WSDL interface description consists of the following five top-level elements:
1) A single types element. Within this element, you define the logical types that you will be referencing later in the specification. Types may be simple (refer to single elements) or complex (combinations of elements, e.g. struct or array). Different typing systems may be used here, but the most common one employed is XML Schema;
2) A set of message elements. A message element corresponds to a single logical "message" that will be sent from client to server or vice versa. Messages consist of "parts"—each part has a type (defined within the types element);

3) A set of portType elements. A portType element corresponds to single logical service definition. Port types consist of a set of operation definitions. An operation has a name and the set of messages involved in requesting execution of that operation (typically a request message, a reply message, and a fault message);

4) A set of binding elements. Up to this point, everything covered in the WSDL document represents a "logical" view of the service. The purpose of the binding elements is to define how the logical messages are represented in a particular markup language/transport. Support theoretically exists for several XML-based transports, but the most common binding is to SOAP/HTTP. In that case, the binding involves mapping each part of each message to the appropriate section of the SOAP document and identifying the approach that will be used for encoding the logically-defined data types in SOAP (typically the SOAP encoding rules are used here); and 5) A service element. Where the binding element is used to map the logical representation to a markup/transport, the service element is used to identify the physical locations that support a particular portType/binding pair. For the typical SOAP-HTTP binding, this would normally consist of uniform resource locators (URLs) (including host and port).

A full WSDL specification thus consists of logical information (types, messages and portTypes), physical information (bindings), and location information (services). Since this information is typically needed by clients at different points in the development, WSDL specifications are often produced in fragments that are assembled together via an analog of the C pre-processor "#include" directive.

Aside from SOAP and WSDL, there are other initiatives that are often considered web services "building blocks", such as XML schema and universal description, discovery, and integration (UDDI) protocol. XML schema provides a set of rules for defining logical data types in XML and is the preferred language for defining types in WSDL. UDDI is an XML-based protocol for obtaining information about the services provided by a particular organization. Typically, UDDI is used to retrieve the complete WSDL specifications (including location information) for a set of operations.

Combined, SOAP and WSDL perform three basic tasks when mapping information exchange onto a structured document:

1) Define a logical model for the interchange (the "parse tree" view of the problem). WSDL provides this.
2) Define a physical model for the interchange (the "on the wire" representation). SOAP provides this.
3) Provide a mapping between the logical and physical models. WSDL provides this.

Consider the following sequence of events, which describes a typical experience for a web services client developer:

The developer first obtains the "logical" portion of WSDL specifications for operations of interest via an "out of band" method, such as email or downloading from a web site.

The Developer imports the WSDL specifications into a web services toolkit and generates a native language (e.g., Java) client application programming interface (API) and writes code to that API.

At runtime, a complete WSDL specification for the operations of interest is obtained via UDDI from a service "registry" at the deployed site. The additional binding and location information in the "complete" WSDL files is necessary for actual communication between client and server (though it does not change the client API originally generated).

When runtime calls are made via the generated client API, they are translated into SOAP documents that are sent to the server via an HTTP POST. The server executes the requested operation and returns the results as a SOAP document via the HTTP POST reply. The returned document is parsed and used to populate the appropriate "output" parameters in the client API.

The two basic approaches represented by SOAP and WSDL have shortcomings. For example, SOAP does not define how one represents the tasks to be executed by the server, how the data associated with the request and reply is structured, relationships between request and reply messages, or real-world issues such as application versioning. These issues must be coordinated between client and server "out of band". WSDL addresses the "logical to physical" mapping problem by individually specifying how different elements in the logical model map to their counterparts in the physical model. Consequently, a consumer of such an interface must parse and understand such mapping instructions, which is not a trivial task. In addition, SOAP and WSDL are both XML-based. Consequently, without either changing the XML specification or manipulating the underlying transport (e.g., HTTP) protocol, one cannot pass binary data without encoding it as text. Other problems are associated with SOAP and WSDL, as described below.

Further, additional facilities are needed for effective implementation of typical web services, which are not provided by known current specifications. These facilities include user identification and authentication, access control, version management, transaction management, and ad hoc (dynamic) "batching" (sending several logical operation requests together in a single physical message).

SUMMARY OF THE INVENTION

The invention includes a processing system comprising a processor and a storage facility storing a program, accessible to a client and a server in a web based network environment, which when invoked by the client or the server, converts between a logical structure that is not specific to any markup language and a markup language encoding of the logical structure, without using any explicitly-declared binding of logical structure to markup language encoding. The logical structure defines a set of operations for a web based application involving the client and the server.

Other features of the present invention will be apparent from the accompanying drawings and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 5 is a high-level block diagram of the WSDK Library;

DETAILED DESCRIPTION

Figure 1:
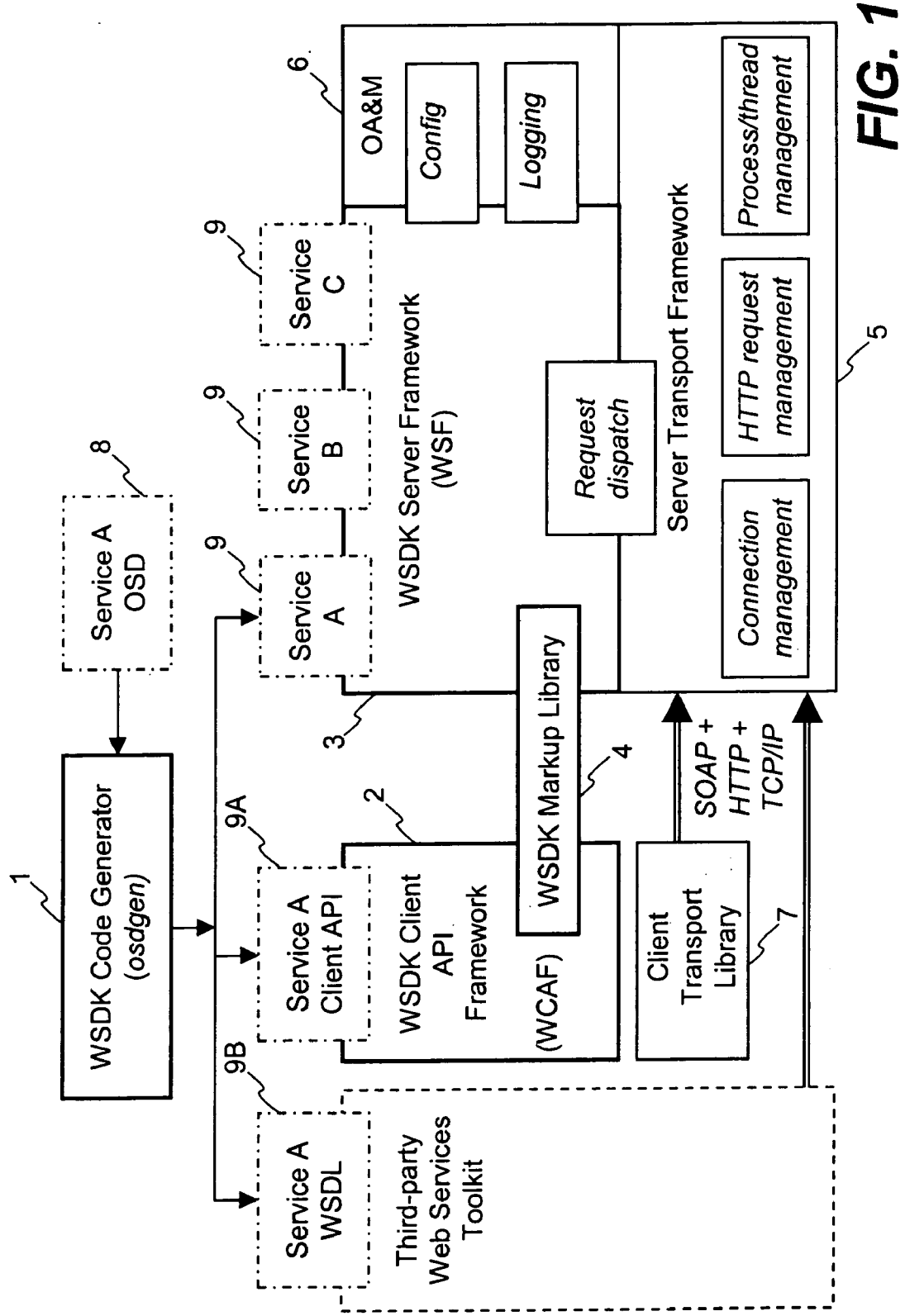
FIG. 1 illustrates a high-level view of the WSDK architecture.

A method and apparatus for developing web services that employ a standard logical interface to support multiple markup implementations are described. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

I. Overview

As described in greater detail below, the present invention introduces a set of build-time tools and run-time components designed to support the development of web services and the interface to those services. These tools and components are referred to collectively as Web Services Development Kit (WSDK). WSDK provides a framework for the development of web services that isolates developers from the implementation details of the markup and transport layers. In particular, WSDK separates the logical aspects of the service development from the physical aspects (markup and transport) so that service developers can focus on business logic and platform developers can take care of mapping the logical model into particular markup languages (or versions of particular languages). Note that for purposes of this document, for ease of reference, different versions or variations of a given markup language shall be treated as different markup languages. WSDK provides additional support for real-world application development and deployment issues not addressed in the standard web services arena, such as batching, transaction management, and versioning, etc.

WSDK provides the above features in a form suitable for the extreme performance and scalability requirements of a carrier-class environment. For example, in certain embodiments of the invention: all server-side code is written in low-overhead C and C++; there is minimal use of dynamic memory allocation and string/data copying; hand-rolled "no copy" parsers are used with little or no dynamic memory allocation; and efficient code generated at build-time is used rather than run-time data dictionary queries.

There are three main areas where WSDK differs conceptually from the service model defined by WSDL. First, the concept of "service" differs between WSDL and WSDK. In WSDL, a service may be viewed as a set of network end-points (host, port, and URI) that support a specific collection of "bound" operations. WSDK, on the other hand, distinguishes between "server" (a run-time software unit that handles requests on an end-point) and "service" (a well-defined collection of operations more akin to the WSDL "portType"). A WSDK server may host multiple services. In the remainder of this document, "service" will be used to mean a top-level aggregation of operations and related data types and fault codes.

Second, WSDL defines a direct relationship between operations and messages. Essentially, the entire content of a message is defined by the logical content and binding method of a single operation. WSDK, on the other hand, introduces an intermediate runtime-only entity known as a call. A call contains a batch (one or more) of operations to be executed in the context of a single request/reply message exchange. Batching is an optional runtime decision made by the client and is only available via the client APIs provided with WSDK. A batch of operations is defined dynamically by a client, based on a previously defined (static) operation structure definition. Thus, a client may dynamically select particular portions of an operation structure definition to incorporate into a message (a batched request), according to its current needs and/or the current state of application execution. Note that messages generated from a call containing only one operation are identical to those defined via WSDL.

Further, in WSDL the relationship between the logical operation request/reply structure and a particular markup language representation is specified via a declarative per-operation syntax. WSDK, on the other hand, uses an entirely different mechanism, employing a markup library that can dynamically translates logical structure to any supported markup language, without using any explicitly-declared binding of logical structure to markup language encoding. Additional markup languages are supported by adding additional modules to the markup library. Where explicit (e.g., WSDL) bindings are required, the hard-coded internal rules are simply translated into WSDL binding statements.

II. WSDK Architecture

To facilitate description of the present invention, various components are described herein as being implemented in a particular programming language, such as C, C++, or Java. It will be recognized that such references to particular programming languages refer only to certain embodiments of the invention, and that in other embodiments, the described components may be implemented in other programming languages and/or by using hardware-based techniques.

FIG. 1 depicts a high-level view of the WSDK architecture according to one embodiment of the invention. There are four types of components depicted in FIG. 1: components of WSDK (indicated by thick solid lines); components related to WSDK but not part of it (indicated by thin solid lines); Operation Structure Definition (OSD) specifications; and generated code (depicted in dashed boxes).

The components of WSDK include a WSDK Code Generator 1, a WSDK Client API Framework (WCAF) 2, a WSDK Server Framework (WSF) 3, and a WSDK Markup Library 4. The Code Generator 1, henceforth referred to as "OSDGen", is a build-time generation tool that parses Operation Structure Definition (OSD) files and generates code for both service implementation and client interface.

The WSF 3 is, in one embodiment, a C++ server framework that manages the runtime operation dispatch process and all associated facilities.

The WCAF 2 is, in certain embodiments, a C or Java client framework that provides a framework within which client APIs are exposed. As described further below, this framework includes an "OipcCall" data structure that is populated with "OipcOperation" objects. The WCAF 2 also includes a set of functions to serialize the request portion of the call to a request document and to populate the reply portion of the call from a reply document. In general, these "call-level" functions are simply wrappers over the operation-specific code generated by OSDGen 1.

The Markup Library 4 is, in certain embodiments, a C or Java markup library that translates logical markup API calls into physical markup (e.g., SOAP). This library 4 is used by both the WSF 3 and the WCAF 2.

The illustrated components related to WSDK include: a Server Transport Framework 5; Operations, Administration, and Management (OA&M) facilities 6; and a Client Transport Library 7. Multiple implementations of these components may exist.

The server transport framework (STF) 5 is responsible for the basic runtime environment the server side. It may be, for example, a UNIX program that is designed to service "request" messages sent from a client over a TCP socket. The STF 5 would typically be capable of servicing multiple requests simultaneously (so it typically either has multiple threads or multiple processes) and may use HTTP as a "tunneling" protocol (e.g., requests are sent via an HTTP POST). The STF 5 would typically allow for the separate development and integration of modules that implement service business logic.

The WSF 3 is provided in the form of a library that is linked into a main program, i.e., the STF 5. The STF 5 "drives" the WSF 3 via two interfaces: a "startup initialization" interface, and a "request dispatch" interface. An example of the STF 5 for WSDK-based servers is the Apache web server. This is combined with a small Apache module that provides the "glue" between Apache and WSF 3.

Thus, the "server-side" can be viewed as having three levels of abstraction:

1) The "server" level (provided by the STF)—a "main" program.

2) The "service framework" level (provided by the WSF 3)—a "module" in the form of a library that is "plugged in" to the server main program.

3) The "service" level—a set of shared libraries (one for each service) that is "plugged in" to the WSF 3.

The OA&M facilities 6 are a set of configuration and logging facilities used by the WSF 3 via an abstract interface. Typically, the STF 5 is responsible for initializing appropriate instances of these facilities.

The Client Transport Library 7 is used by the client for communication with WSDK-based servers when the generated WCAF 2 is employed. The Client Transport Library 7 provides basic TCP/IP connection management and client-side HTTP support.

Operation Structure Definition (OSD) Specifications 8 are input files that are provided by developers and are described further below.

The generated code shown as dashed-line boxes 9 in FIG. 1 includes components generated by OSDGen 1 and described in greater detail below.

The Service Implementations are the server-side code (e.g., C++) generated by OSDGen 1. They include a combination of type declarations, service initialization, operation serialization and validation, and skeletons for operation business logic.

The Service Client APIs 9A are the client-side code (e.g., C or Java) that corresponds to individual operations. This code includes a combination of type declarations and operation serialization logic.

The Service WSDL Specifications 9B are the WSDL specifications (logical and binding descriptions only) that correspond to the operations of the service. They are provided as an alternative to using the client APIs. Note that WSDL location information (e.g., host and port) is not provided by WSDK, since it depends upon information known only at deployment. Clients that intend to use WSDL specifications must obtain the location information via another facility.

Figure 2:
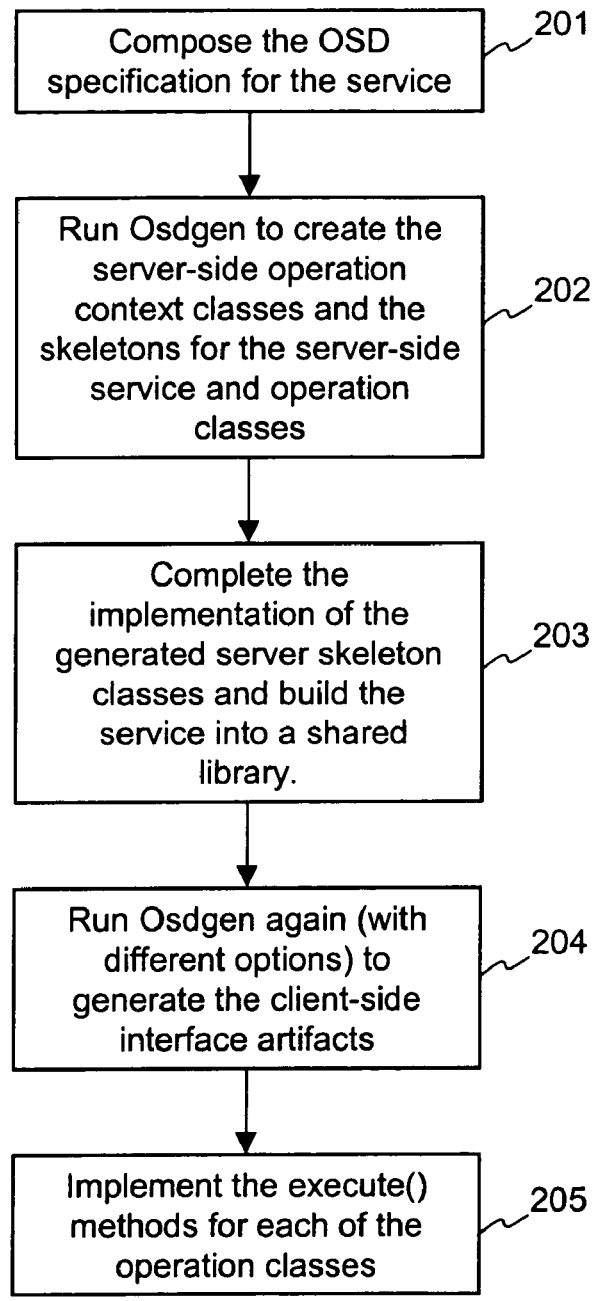
FIG. 2 shows a process performed by a service developer during a WSDK-based development project.

Referring now to FIG. 2, a WSDK-based development project will normally include the following process performed by the service developer:

Compose the OSD specification for the service (block 201), i.e., construct the OSD file(s) for the service being defined, including the specifications for each of the operations the service will provide. OSD and OSDGen 1 are described further below.

Run OSDGen 1 (block 202) to create the server-side operation context classes and the skeletons for the server-side service and operation classes.

Complete the implementation of the generated server skeleton classes and build the service into a shared library (block 203). When this library is placed in a designated directory, the service will automatically be loaded and initialized during WSF startup initialization. This stage includes developing the set of utility classes that will be needed by the operation during execution. Typically, this might include code for interfacing with database systems, authenticating users, etc. Where appropriate, implement the "Transaction Member" interface for participation in the message-defined transaction model.

Run OSDGen 1 again (with different options) to generate the client-side interface artifacts (block 204), including: Logical and binding portions of WSDL specifications for the service. Fault message catalogs that can then be localized for display of human-readable fault messages; and client APIs.

Implement the execute( ) methods for each of the operation classes (block 205).

II. Network Environment

Figure 3:
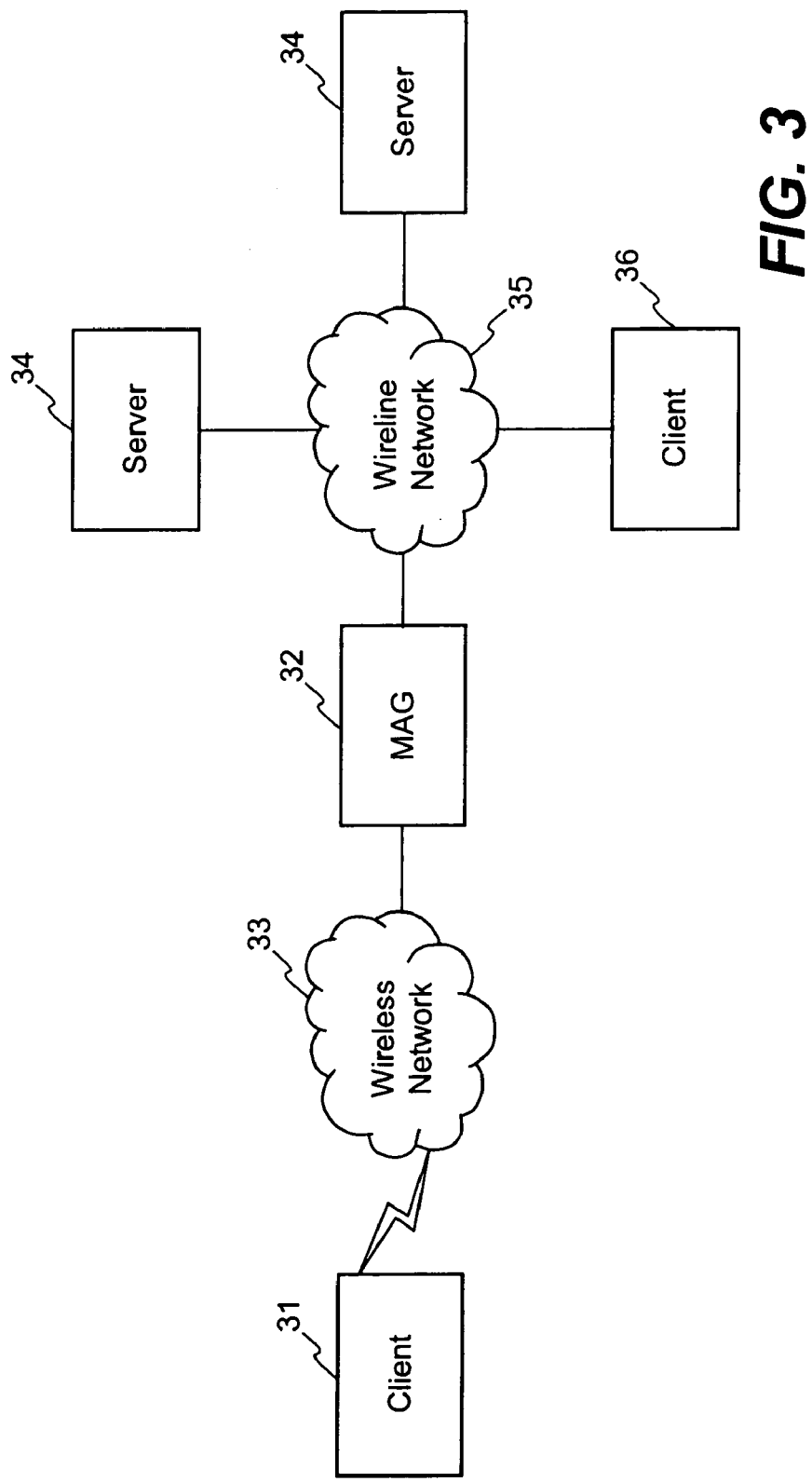
FIG. 3 shows an example of a network environment in which WSDK can be implemented.

FIG. 3 shows an example of a network environment in which WSDK and other aspects of the present invention may be implemented. Note, however, that the invention can also be implemented within many other network configurations. As shown, a wireless client device 31 is connected to a mobile access gateway (MAG) 32 through a wireless network 33. The wireless client 31 device may be, for example, a cellular telephone, personal digital assistant (PDA), two-way pager, or other similar device. The MAG 32 is connected to a number of servers 34 through a wireline computer network ("wireline network") 35, which may be the Internet, for example. A second client device 36 is connected to the server directly through the wireline network. Client device 36 may be, for example, a conventional personal computer (PC), workstation, or other similar device.

The MAG 32 controls the connection to the wireless client device 31 (session management), retrieving content from the origin server 4 on behalf of the wireless client device 31 (proxying), and ensuring that the content is in a form that the wireless client device 31 can understand (translation). The MAG 32 may also perform many other functions, such as billing, enhanced services, and push content delivery.

In various other embodiments, the wireline network 35 could be a type of network other than the Internet, such as a local area network (LAN), a private wide area network (WAN), or a corporate intranet.

One or more wireless client devices 31 can be connected to one or more servers 34 on the wireline network 35 through the MAG 32. Likewise, one or more other client devices 36 can be connected to one or more servers 34 in this manner directly through the wireline network 35. Any of the clients and servers shown in FIG. 2 may implement WSDK and other features of the invention described herein.

As noted, the invention can also be implemented within many other network environments. For example, the invention can be implemented advantageously in purely-wireline network environments, i.e., in network environments which do not included a wireless network or wireless (mobile) devices.

III. WSDK Server Framework (WSF)

Figure 4A:
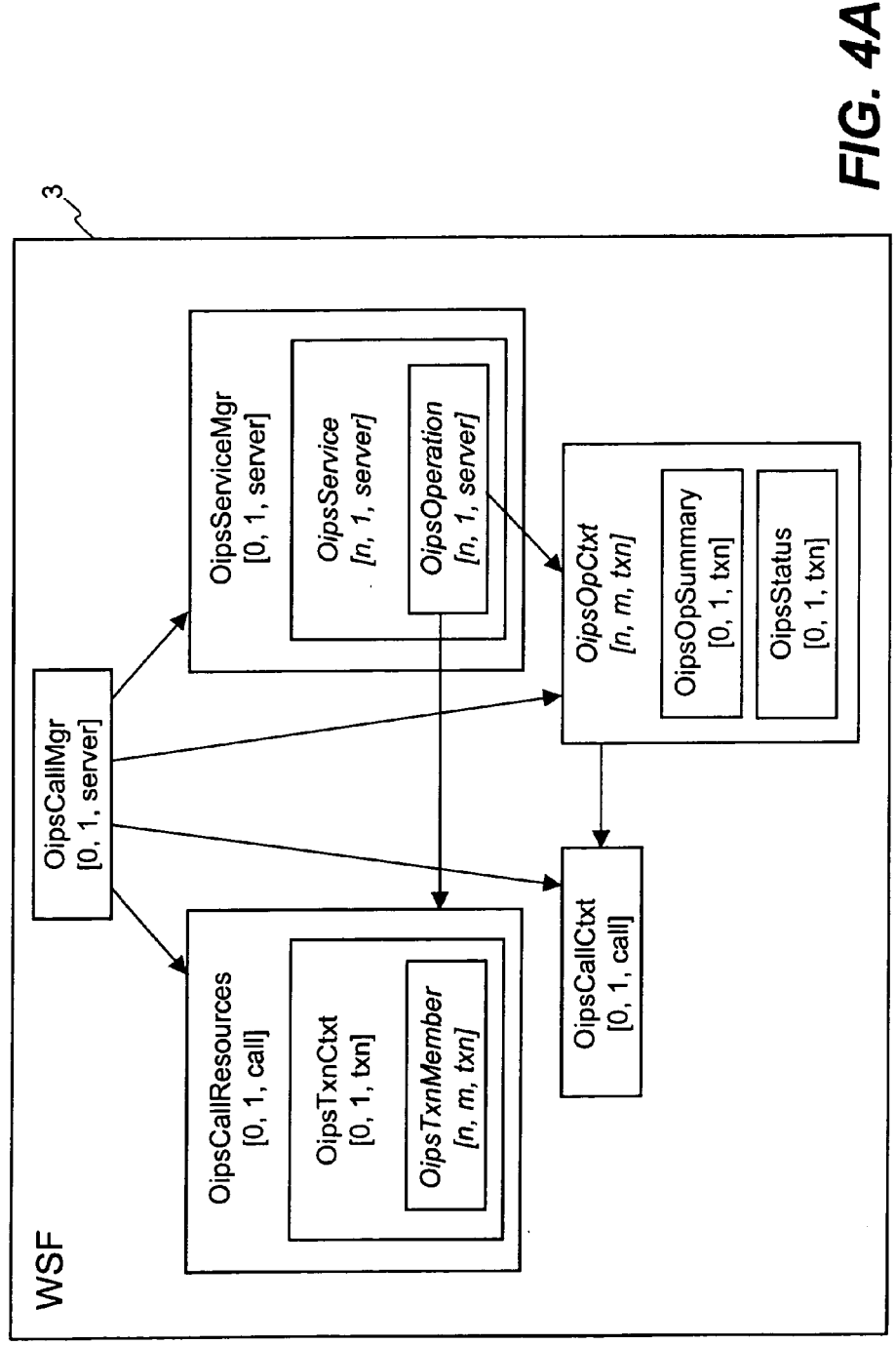
FIG. 4A shows components of the WSDK Server Framework.

FIG. 4A shows the key classes/objects in the WSF 3 and the high-level relationships (control flow) between them. The classes include: OipsCallMgr, OipsCallResources, OipsServiceMgr, OipsCallCtxt, and OipsOpCtxt. OipsCallResources has a subclass OipsTxnCtxt, which has a subclass OipsTxnMember. OipsServiceMgr has a subclass OipsService, which has a subclass OipsOperations. OipsOpCtxt has subclasses OipsOpSummary and OipsStatus.

Following each class name in FIG. 4A are three additional items of information (in the following order):

The number of subclasses of the given class that may exist. If the number is 0, the class may not be subclassed. For both subclass and object cardinality, "n" and "m" mean "any number".

The number of instances (objects) of that class, relative to the enclosing object. If a class is an abstract parent class (listed in italics), then this refers to the number of instances of each subclass. Otherwise, it is the number of objects of the listed class.

The lifetime of objects of that class.

There are three possible lifetimes of an object: server, call, and txn. Objects with "server" lifetime are created and initialized during server initialization and exist for the lifetime of the server. Objects with "call" lifetime are created and initialized when a new request message is received by the call manager and exist until the reply message has been generated. Objects with "txn" lifetime are created and initialized at the beginning of a logical transaction. Depending upon the error handling method identified in the request message, a transaction will either span an entire call or just the execution of a single operation (for calls that contain only one operation request, this distinction is moot).

The roles of the key classes/objects of the WSF 3 will now be described. The OipsCallMgr object coordinates the call dispatch process. This object is responsible for initializing the call context and resources, for dispatching the operation executions, and for all major error handling and transaction management logic. The OipsCallMgr is a concrete class (no subclassing) with a single instance that exists for the lifetime of the server. The functionality of this class is described further below.

The OipsCallResources object is a holder for call-related resources that do not directly correspond to items in the request or reply messages.

The OipsTxnCtxt object contains a list of members (instances of subclasses of OipsTxnMember) of the current transaction and delegates commit( ) and rollback( ) methods to those objects.

The OipsCallCtxt object contains the parsed request message and partially generated reply message for the current call and provides methods for traversing the request and populating the reply. This class is the server-side equivalent to "OipcCall" on the client side (see description of WCAF, below). Hence, OipsCallCtxt includes:

requestDoc (OipmInputDoc)—the parsed request received from the client replyDoc (OipmOutputDoc)—the reply document sent (or will send, when it is completed) to the client.

errorMode (enum OipcErrorMode)—the indication of the error mode to be used (e.g., "stop", "continue", or "rollback") when executing the operations in a request. In "stop" mode, execution of the operations for the request is stopped in response to an error occurring during execution of the operations. In "continue" mode, execution of the operations for the request continues in response to an error occurring during execution of the operations. In "rollback" mode, execution of the operations for the request is stopped in response to an error occurring during execution of the operations, and the state that existed immediately prior to execution of the first operation for the request is resumed.

The OipsServiceMgr object is responsible for loading service implementations (during server initialization) and for providing access to service operations (during request processing).

The OipsService class is an abstract parent class. Each implemented service will have one subclass of OipsService and one instance of that subclass. Service classes are primarily responsible for initializing operations (during server initialization) and for providing access to operations (during request processing). Service class skeletons are generated by OSDGen 1. In many cases, the generated code is sufficient.

The OipsOperation class is an abstract parent class. Each implemented operation will have one subclass of OipsOperation and one instance of that subclass. Operation class skeletons are generated by OSDGen 1 and contain an execute( ) method that is invoked by the OipsCallMgr object to execute a particular operation. Many subclasses of the OipsOperation class may exist. For each subclass, there is exactly one instance that exists for the lifetime of the server.

The OipsOpCtxt class is an abstract parent class that contains the "request" and "reply" fragments for each operation found in the request. OipsOpCtxt is equivalent to "OipcOperation" on the client side. Each implemented operation will have one subclass of OipsOpCtxt. Instances of these subclasses are created as necessary (by the OipsCallMgr object via delegation through the OipsServiceMgr object) to hold the data contained in the current request. Operation context classes are fully generated by OSDGen 1 and do not require any manual coding. OipsOpCtxt contains the following standard methods:

parseRequest( )—similar to "docToReply" function of OipcOperation. This populates the "request" portion of the operation context from data parsed from the requestDoc of the call context.

writeReply( )—similar to "requestToDoc" function of OipcOperation. This writes the "reply" data from the operation context into the replyDoc of the call context.

OipsOpSummary objects contain the set of information that will be logged in the operation summary logs for the execution of the associated operation. There is a standard set of information provided automatically by WSF. Individual operations can augment this information by adding additional parameters (with names of the form "x-name").

OipsStatus objects are used for reporting application faults. A standalone OipsStatus population function is automatically generated by OSDGen 1 for each faultdef defined for a service.

The objects and processes used on the server side are described further below.

IV. WSDK Client API Framework (WCAF)

Figure 4B:
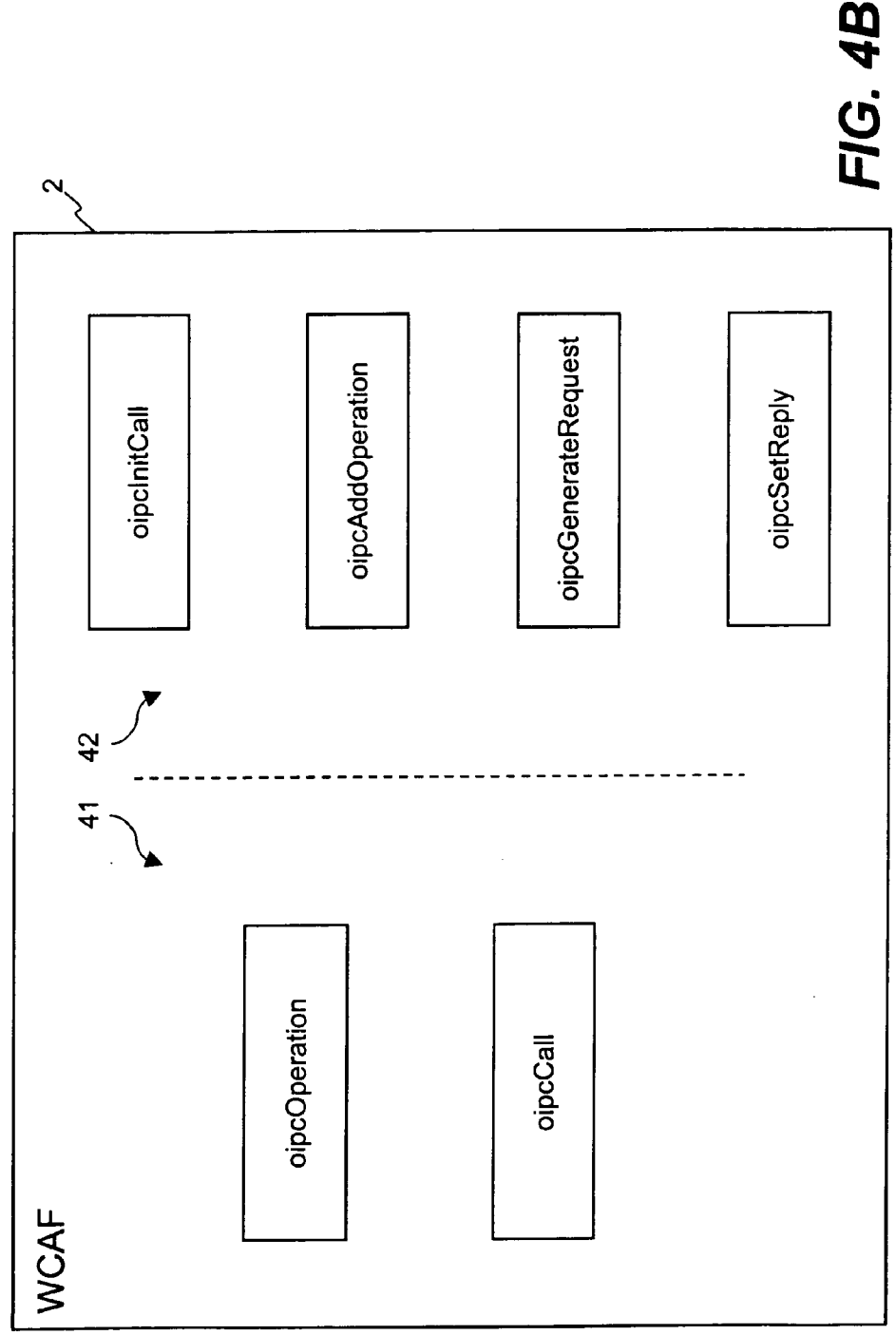
FIG. 4B shows components of the WSDK Client API Framework.

The WCAF 2 will now be described with reference to FIG. 4B. In the illustrated embodiment, the WCAF 2 includes two data structures 41, named OipcOperation and OipcCall, and a set of functions 42, named oipcInitCall, oipcAddOperation, oipcGenerateRequest, and oipcSetReply.

The OipcOperation data structure represents an instance of a particular operation. This structure is utilized in a manner similar to a C++ abstract class—it defines a set of standard attributes and function pointers. Actual operations have their own unique structure types (but may be "casted" to OipcOperation). The OipcOperation structure contains the following:

requestToDoc(OipcCall*, OipcOperation*)—write the request data from the operation into the "output document" of the OipcCall.

docToReply(OipcCall*, OipcOperation*)—read from the "input documen" of the OipcCall and write to the "reply" portion of the operation.

cleanup(OipcOperation*)—clean up any memory allocated by "docToReply".

Each "derived" OipcOperation structure also contains a "request" structure and a "reply" structure.

The OipcCall structure contains the contents of an entire message exchange between client and server, i.e.:

requestHeader (struct OipcRequestHeader)—a simple structure containing standardized request message header information (mostly client identification information used for logging).

replyHeader (struct OipcReplyHeader)—a simple structure containing standardized reply message header information (mostly server identification information).

ops (OipcOperation*[ ])—an array of "OipcOperation" structures.

markupStyle (enum OipmMarkupStyle)—the markup "style" used for this call (e.g., Lite, SOAP). A markup style corresponds to a markup language. It includes an enumerated type and an associated markup implementation (a software module) that handles conversion between the "generic" data format and a markup language-specific data format.

errorMode (enum OipcErrorMode)—the error mode the server should use when executing the request (continue, stop, or rollback).

requestDoc (OipmOutputDoc)—the request document created when the "requestToDoc" functions for all the operations in "ops" are called.

replyDoc (OipmInputDoc)—the reply document parsed from the reply buffer received from the server.

The functions included in the WCAF 2 are oipcInitCall, oipcAddOperation, oipcGenerateRequest, and oipcSetReply. These functions are defined as follows:

oipcInitCall(OipcCall*,OipmMarkupStyle,OipcErrorMode)—initialize a new call oipcAddOperation(OipcCall*,OipcOperation*)—Add an operation to this call (the "request" portion of the operation structure should be filled out before calling this function).

oipcGenerateRequest(OipcCall*, char**, unsigned*)—Finalize the request message and return it as a text buffer for submitting to the server (calls the "requestToDoc" functions for each operation in the call).

oipcSetReply(OipcCall*, char*, unsigned)—Parse the given reply buffer received from the server and use it to populate the reply part of each of the call's operations (calls the "replyToDoc" functions for each operation in the call).

As can be seen from the foregoing description, the WCAF 2 has components that mirror the functionality of the server side, but with some important differences. On the client side, a call is created from scratch. Separately, operations are created from scratch, their request portions are populated, and they are added to the call. The call is then serialized into a request message and sent to the server. The resulting reply message is parsed and used to populate the "reply" portions of each of the operations.

In contrast, on the server side, a call is initialized with the incoming request document. No operation structures are contained within the call structure. Instead, operation structures are created as the request document is parsed and the reply document is written.

V. WSDK Library

The WSDK Library 4 (also called the "markup engine" or "markup library") has two modules: an input module 51 and an output module 52, as shown in FIG. 5. Before examining these two modules in detail, however, note first that there are three principals in the markup space: 1) the "core" markup library; 2) markup implementations (described below); and 3) users of the markup library. Between these three principals, there are four distinct visibility relationships, that apply to both the input module 51 and the output module 52:

The core markup library exports public data structures ("core-public-data") for use by both users of the markup library and markup implementations.

The core markup library exports a public interface ("core-public-func") for use by users of the markup library.

The core markup library exports a private interface ("core-private") for use by markup implementations ("core-private").

Markup implementations export private interfaces ("markup-private") for use by the core markup library ("markup-private").

The above topology applies to both the input module 51 and the output module 52 of the WSDK Library 4.

A. Input Module

In accordance with one embodiment of the invention, the input module 51 includes the following elements:

A single complex (core-public-data) data structure, called OipmInputDoc, used by both markup library users and markup implementations.

A set of (core-public-func) functions for "reading" the data structure, used by markup library users.

A set of (core-private) functions for "writing" the data structure, used by markup implementations.

A single (core-public-func) function for "creating" the data structure, used by markup library users. For each markup implementation, there is a single (markup-private) function that is invoked from the core-public-func function. This markup-private function uses the core-private functions to construct the OipmInputDoc.

A single (core-public-func) function for "destroying" the data structure, used by markup library users.

Figure 6:
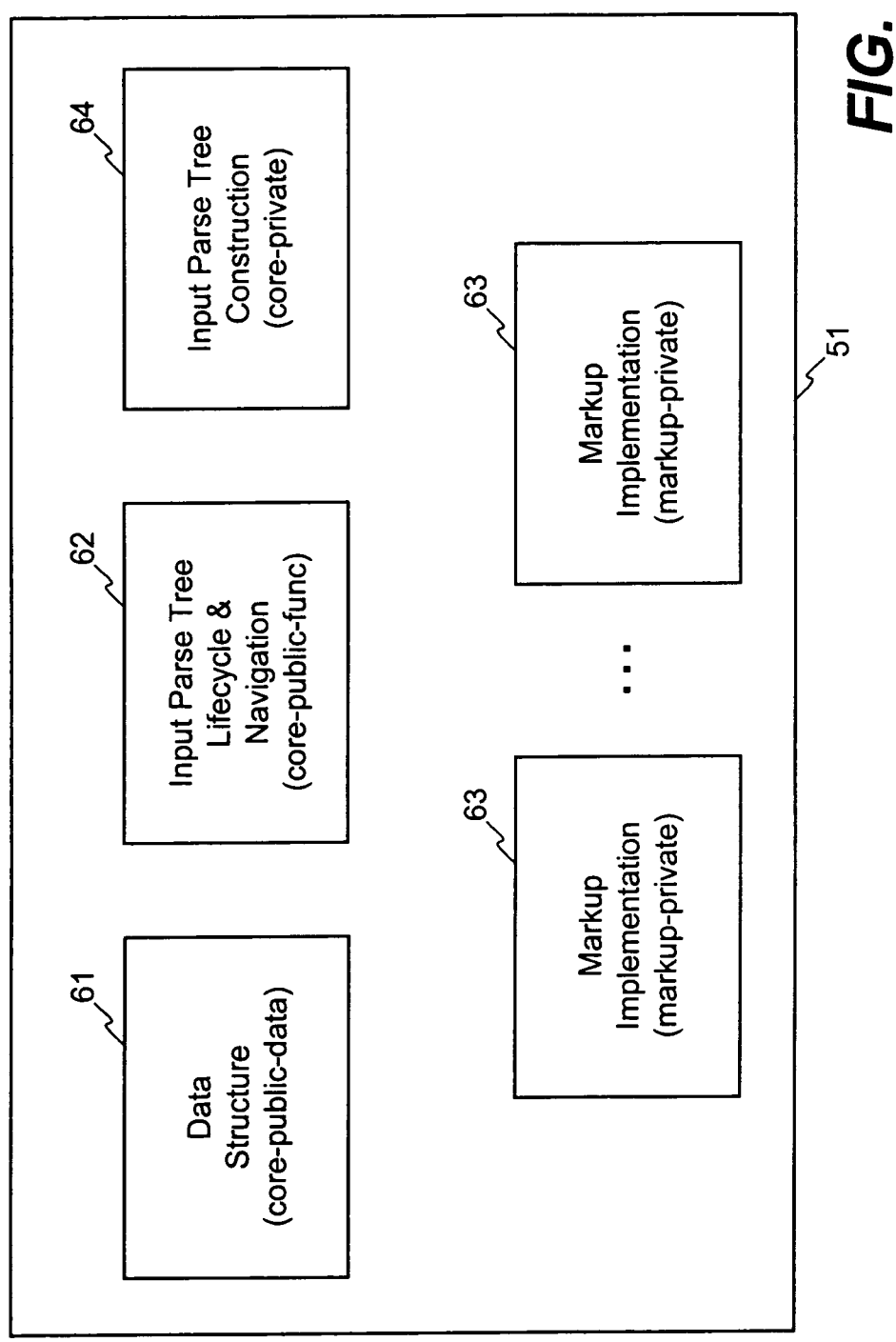
FIG. 6 shows components of the input module of the WSDK Library.

Thus, the input module 51 is illustrated conceptually in FIG. 6, according to one embodiment. As shown, the input module 51 includes the data structure 61, called OipmInputDoc (core-public-data), a submodule 62 (core-public-func) that handles the lifecycle and navigation of the input parse tree, a submodule 64 (core-private) that handles construction of the input parse tree, and a set of input markup implementations 63 (markup-private).

The OipmInputDoc data structure 61 is a complex data structure that is used by both markup library users and markup implementations 63. It includes the following fields: 1) a "markup style" (i.e., an enumerated type defined as part of (core-public-date) and an associated markup implementation 63 that handles converting between the "generic" data format and a markup language-specific data format); 2) a reference to the raw text buffer that was used to construct the input document (this buffer is modified as the document is parsed); 3) an array of "entries"; 4) an array of entry "entry arrays"; and 5) a "current group" context. The "markup style" indicates the markup style that is in effect for the document.

An "entry" represents an entity found while parsing the document. There are two basic types of entries (indicated with a Boolean flag): an "item" entry and a "group" entry. An "item" entry has a single value associated with it. A "group" entry, which has a list of "child" entry arrays associated with it (see below). The parent-child relationship between groups and their sub-entries directly corresponds to the typical hierarchy one observes from structured documents. Consider the following example:

```
<foo>
    <bar1>value1</bar1>
    <bar2>value2</bar2>
</foo>
```

In this case, the group "foo" has two children (bar1 and bar2).

An entry array provides a mechanism for aggregating multiple entries with the same name. Entry arrays have a "name" and one or more child entries (the child entries may be items or groups). The parent-child relationship between entry arrays and entries is not typically apparent from an examination of original document—it is an artifact of the implementation to support asking for entries by name and index.

Consider the following document fragment:

```
<foo>
    <bar>bar value 1</bar>
    <bar>bar value 2</bar>
    <fubar>fubar value</fubar>
</foo>
```

This write in would be represented in the parse tree as follows:

* Entry array with name "foo"
    * Group entry (index 0)
        * Entry array (index 0) with name "bar"
            * Item entry (index 0) with value "bar value 1"
            * Item entry (index 1) with value "bar value 2"
        * Entry array (index 1) with name "fubar"
            * Item entry at index 0 with value "fubar value"

As noted above, the input module 51 of the markup library 4 includes a submodule 62 (core-public-func) that handles the lifecycle and navigation of the input parse tree, and a set of markup implementations 63. A set of key functions for operating on the input document form at least a portion of submodule 62 and markup implementations 63. These functions, according to one embodiment, are named: oipmInitInputDoc, oipmNumEntries, oipmOpenGroup, oipmGet* (where"*" represents one of several possible suffixes), and oipmCloseGroup, and are characterized as follows:

oipmInitInputDoc(IN inputDoc, IN buffer, IN markupStyle)—this function inputs a text buffer and a markup style (how the text buffer should be interpreted). The function is called with an empty parse tree (no entries or entry arrays). When it returns, the parse tree is fully populated. All of the other input functions operate on the parse tree, not on the original text buffer. Documents have a single top-level group and the "current group" is set to this top-level group.

Note that documents written in any markup language (within reasonable bounds) can be converted into a standardized parse tree—thus document navigation is fully insulated against differences in markup languages. Note also that for purposes of this document, for ease of reference, different versions or variations of a given markup language shall be treated as different markup languages.

oipmNumEntries(IN inputDoc, IN name, OUT count)—This function looks for an entry array within the current group with the given name and then returns the number of child entries for that array. If no array is found with the given name or it contains no entries, 0 is returned.

oipmOpenGroup(IN inputDoc, IN name, IN index)—This function looks (within the current group) for an entry array with the given name and an entry with the given index within that array, checks to see if that entry is a group, and if so, changes the "current group" context to that group.

oipmGet*(IN inputDoc, IN name, IN index, OUT value)—These functions (oipmGetData, oipmGetInt, and oipmGetString) look for an entry array (within the current group) with the given name and a child with the given index and returns the value associated with that child entry.

oipmCloseGroup(IN inputDoc)—This function switches "current group" to the parent of the current group (the parent of the array within which the current group is located). Equivalent to a "cd.." in a UNIX shell.

Submodule 64 (core-private) includes a set of implementation "helper" functions that are used by markup implementations to build the parse tree. These helper functions, according to one embodiment, are named: oipmiAddArray, oipmiAddEntry, oipmiGetArray, oipmiGetEntry, oipmiNewArray, and oipmiNewEntry, and are characterized as follows:

oipmiAddArray (IN inputDoc, IN groupEntry, IN entryArray)—adds the given array as a child of the given group entry.

oipmiAddEntry (IN inputDoc, IN entryArray, IN entry)—adds the given entry as a child of the given entry array.

oipmiGetArray(IN inputDoc, IN name, OUT entryArray)—returns the entry array with the given name within the current group.

oipmiGetEntry(IN inputDoc, IN name, IN index, OUT entry)—returns the entry at position "index" within the array named "name" found within the current group.

oipmiNewArray(IN inputDoc, OUT entryArray)—returns a newly initialized entry array oipmiNewEntry(IN inputDoc, OUT entry)—returns a newly initialized entry.

The input module 51 also includes a set of input markup implementations 63, as noted above. Each markup style has an associated input markup implementation. When "oipmInitInputDoc" is called, the markup library calls the appropriate markup implementation, based upon the markup style selected. The markup implementations are expected to parse through the original input buffer (possibly modifying it) and use the helper functions described above to construct the input document parse tree.

Note that the markup implementations 63 and the implementation helper functions are not visible to users of the WSDK Library 4—they are artifacts of markup language implementation.

B. Output Module

The output module 52 of the markup library 4 is based on a similar principle to that of the input module 51 (i.e., users of the library construct documents via a standardized logical model without regard to markup-language specific issues) but has a different implementation. A strict inversion of the input module would involve creating a parse tree via a set of markup-neutral API functions, followed by a markup-specific translation of that parse tree to a text buffer. For performance reasons, however, only a very sparse amount of context information is maintained and the output document is mostly built on the fly.

The output module 52 has a structure similar to that of the input module 51 represented in FIG. 6. In particular, the output module 52 includes:

A single complex (core-public-data) data structure, called OipmOutputDoc, used by both markup library users and markup implementations.

A set of (core-public-func) functions for "writing" the data structure, used by markup library users. For each markup implementation, there is a (markup-private) function that corresponds to (almost every) core-public-func function.

A single (core-public-func) function for "initializing" the data structure, used by markup library users. For each markup implementation, there is a (markup-private) function that corresponds to this initialization function. These markup-private functions typically have very little functionality.

A set of (core-private) functions for "writing" the data structure, used by markup implementations.

The data structure OipmOutputDoc represents the document under construction. Key fields of this structure include: 1) A markup style, 2) a group "stack"; and 3) the output buffer under construction. The group "stack" is used to capture the context for the output document. For example, suppose we were at the following location in a document:

```
<group1>
    <blah>blahblah</blah>
    <group2>
```

-continued

```
        <blah>blahblah</blah>
        <group3>
            <-- we're here
```

In this case, the group stack would contain:
group1
group2
group3 <--top of stack Similarly to the input module 51, the output module 52 includes a set of key functions for operating on output documents, which according to one embodiment are: oipmInitOutputDoc, oipmBeginGroup, oipmEndGroup, and oipmPut* (where"*" represents one of several possible suffixes). These functions are characterized as follows:

oipmInitOutputDoc(IN outputDoc, IN markupStyle)—initializes the document appropriately for the given markup style. Note that this function provides much less functionality than its counterpart in the input module 51, oipmInitInputDoc.

oipmBeginGroup(IN outputDoc, IN name)—open up a group with the given name within the current context (and add the new group name to the top of the group stack). For a markup language based on XML, this would typically involve writing the group name within <>, e.g.:

oipmBeginGroup(odoc, "foo")

would add "<foo>" to the output document.

oipmEndGroup(IN outputDoc)—close the current group and remove it from the top of the group stack. For a markup language based upon XML, this would typically involve writing a close tag for the group, e.g.:

oipmBeginGroup(odoc, "foo1");
oipmBeginGroup(odoc, "foo2");
oipmEndGroup(odoc);
oipmEndGroup(odoc);
might result in:

```
<foo1>
    <foo2>
    </foo2>
</foo1>
``` oipmPut*(IN outputDoc, IN name, IN value)—write an item of the appropriate type (oipmPutData, oipmPutInt, oipmPutString) into the document, e.g.:

oipmBeginGroup(odoc, "group1");
oipmPutString(odoc, "foo", "foo_value");
oipmBeginGroup(odoc, "group2");
oipmPutInt(odoc, "ifoo", 10);
oipmEndGroup(odoc);
oipmEndGroup(odoc);
might result in something like:

```
<group1>
    <foo>foo_value</foo>
    <group2>
        <ifoo>10</ifoo>
    <group2>
<group1>
```

An implementation helper function in the output module 52 reserves space in the output buffer prior to writing to it. This function, oipmiReserveOutput, is defined as follows:
    oipmiReserveOutput(IN outputDoc, IN bytesNeeded)

The output module 52 also contains a set of output markup implementations, as noted above. Input markup implementations 63 include a single function that is called from oipmInitInputDoc. Output markup implementations, however, include a set of functions to accomplish each of the following actions:
    Initializing the output buffer
    Beginning a group
    Ending a group
    Writing a data buffer
    Writing an integer
    Writing a string
    Finalizing an output buffer When the corresponding API function is called by a user of the markup library API, that function in turn calls the appropriate implementation function (based upon the markup style registered for the document).

C Header Files

In one embodiment of the invention, the above-described data structures and key functions for both the input module 51 and the output module 52 are all declared in a single C header file. The implementation helper functions are declared in a separate header file (for use by markup implementers).

In one embodiment, these header files are named oip_markup.h, oip_markup_impl.h, oipm_light.h, and oipm_soap.h, and are defined as follows:

oip_markup.h: Contains definitions for OipmInputDoc, OipmOutputDoc, and public oipm* functions. Used by programmers who code to a WSDK-based client API.

oip_markup_impl.h: Contains declarations for all oipmi* functions. Used by markup implementors.

oipm_light.h: Contains declarations for the "Lite" markup. Used by markup library.

oipm_soap.h: Contains declarations for the "SOAP" markup. Used by markup library.

D. Markup Implementations

In one embodiment of the invention, the WSDK library includes markup implementations to support at least two markups, SOAP and OIP-LIGHT.

1. OIP-LITE Markup Implementation

The OIP-LITE markup language has a simple syntax. Groups entries are represented as:

---
groupName (
)
---

Item entries use a simple run-length encoding mechanism for values:
FirstName 6
Andrew
(In this case "6" is the length of the value "Andrew" associated with the entry named "FirstName").
For example:
oipmInitOutputDoc(odoc, eOipmLITE);
oipmBeginGroup(odoc, "Person");
oipmPutString(odoc, "FirstName", "Andrew");
oipmPutString(odoc, "LastName", "Large");
oipmPutInt(odoc, "Age", 36);
oipmEndGroup(odoc);
oipmFinalizeOutput(odoc, buf);
    would result in a buffer that contains:
Envelope (
Person (
FirstName 6
Andrew
LastName 5
Large
Age 2
36
)
)
    When parsed into an input document, you would have:

---
    array "Envelope"
        entry (group) 0
            array "Person"
                entry (group) 0
                    array "FirstName"
                        entry (item) 0, value "Andrew"
                    array "LastName"
                        entry (item) 0, value "Large"
                    array "Age"
                        entry (item) 0, value "36"
---

2. SOAP Markup Implementation

The SOAP implementation can be simply an XML parser generator with some hard-coded conventions around special elements, including the SOAP "envelope", "header", and "body" groups. For example:
oipmInitOutputDoc(odoc, eOipmSOAP);
oipmBeginGroup(odoc, "Person");
oipmPutString(odoc, "FirstName", "Andrew");
oipmPutString(odoc, "LastName", "Large");
oipmPutInt(odoc, "Age", 36);
oipmEndGroup(odoc);
oipmFinalizeOutput(odoc, buf);
    would result in:

---
<SOAP-ENV:Envelope xmlns:SOAP-
ENV="http://schemas.xmlsoap.org/soap/envelope/">
    <SOAP-ENV:Body>
        <oip:envelope
xmlns:oip="http://www.openwave.com/protocols/oip/">
            <oip:Person>
                <oip:FirstName>Andrew</oip:FirstName>
                <oip:LastName>Large</oip:LastName>
                <oip:Age>10</oip:Age>
            </oip:Person>
        </oip:envelope>
    </SOAP-ENV:Body>
</SOAP-ENV:Envelope>
--- and would have exactly the same parse tree structure as the "LITE" version for the input document.

In one embodiment of the invention, the SOAP markup implementation includes the following functions and operates as described:

oipmsParseDoc( )—this is called from oipmInitInputDoc when the markup style is SOAP. Its role is to parse through a buffer containing SOAP/XML markup and build the corresponding parse tree. Consider the following document:

```
<SOAP-ENV:Envelope . . . >
<SOAP-ENV:Body>
<oip:envelope . . . >
    <oip:AuthUser>
        <oip:userName>user</oip:userName>
        <oip:password>password</oip:password>
    </oip:AuthUser>
</oip:envelope>
</SOAP-ENV:Body>
</SOAP-ENV:Envelope>
```

The function would skip over the SOAP-ENV tags to find the "oip:envelope" tag, and then:

When it found the opening "oip:envelope" tag, it would call:

oipmiNewEntry( )—to create an entry for the envelope group oipmiNewArray( )—to create an array for the envelope group oipmiAddEntry( )—to add the envelope entry to the envelope array.

and then set the newly created entry as the current group.

When it found the "oip:AuthUser" tag, it would call:

oipmiNewEntry( )—to create an entry for the AuthUser group oipmiNewArray( )—to create an array for the AuthUser group oipmiAddArray( )—to add the AuthUser array to the envelope group oipmiAddEntry( )—to add the AuthUser entry to the AuthUser array and then set the newly created entry as the current group.

When it found the "oip:userName" tag, it would call:

oipmiNewEntry( )—to create an entry for the userName item oipmiNewArray( )—to create an array for the userName item oipmiAddArray( )—to add the userName array to the AuthUser group oipmiAddEntry( )—to add the userName entry to the username array When it found the "user" text for the oip:userName tag, it would change the entry type to ITEM, set the value to point to where "user" occurred in the text buffer, and skip past the "/oip:userName" closing tag.

When it found the "oip:password" tag it would call:

oipmiNewEntry( )—to create an entry for the password item oipmiNewArray( )—to create an array for the password item oipmiAddArray( )—to add the password array to the AuthUser group oipmiAddEntry( )—to add the password entry to the username array When it found the "password" text for the oip:password tag, it would change the entry type to ITEM, set the value to point to where "password" occurred in the text buffer, and skip past the "/oip:password" closing tag.

When it found the "/oip:AuthUser" closing tag, it would change the current group to the parent of the AuthUser array (the envelope group).

When it found the "/oip:envelope" closing tag, it would change the current group to the parent of the envelope array (the top context of the document).

oipmsBeginGroup—called from oipmBeginGroup when the markup style is SOAP. Example:

oipmsBeginGroup(doc, "AuthUser")

would call:

oipmsReserveOutput(doc, 15);

oipmiOutputData(doc, "<oip:AuthUser>\n");

and then push "AuthUser" onto the output group stack.

oipmsEndGroup—called from oipmEndGroup when the markup style is SOAP. Example:

oipmsEndGroup(doc)

would call:

oipmiReserveOutput(doc, 16);

oipmiOutputData(doc, "</oip:AuthUser>\n");

and then pop "AuthUser" off the output group stack.

oipmsFinalize—called from oipmFinalizeOutput when the markup style is SOAP. This just adds the SOAP closing tags to the document, e.g.:

static const char* soapTrailer="</SOAP-ENV:Body>\n</SOAP-ENV:Envelope>\n";

oipmiReserveOutput(doc, strlen(soapTrailer));

oipmiOutputData(doc, soapTrailer);

oipmsInitDoc—called from oipmInitOutputDoc when the markup style is SOAP. This just adds the SOAP header tags to the document, e.g.:

static const char* soapHeader="<SOAP-ENV:Envelope>\n<SOAP-ENV:Body>\n";

oipmiReserveOutput(doc, strlen(soapHeader));

oipmiOutputData(doc, soapHeader);

oipmsPutData—called from oipmPutData when the markup style is SOAP. This encodes the data in base64 and then writes the data to the document, e.g.:

char encodedBuffer[ ];

base64Encode(buffer, encodedBuffer);

oipmiReserveOutput(doc, strlen(encodedBuffer)+(strlen(name)+7)*2);

oipmiOutputData(doc, "<oip:");

oipmiOutputData(doc, name);

oipmiOutputData(doc, ">");

oipmiOutputData(doc, encodedBuffer);

oipmiOutputData(doc, "</oip:");

oipmiOutputData(doc, name);

oipmiOutputData(doc, ">");

oipmsPutString—called from oipmPutString when the markup style is SOAP, e.g.:

oipmiReserveOutput(doc, strlen(buffer)+(strlen(name)+7)*2);

oipmiOutputData(doc, "<oip:");

oipmiOutputData(doc, name);

oipmiOutputData(doc, ">");

oipmiOutputData(doc, buffer);

oipmiOutputData(doc, "</oip:");

oipmiOutputData(doc, name);

oipmiOutputData(doc, ">");

VI. OSD and OSDGen

Development of a WSDK-based service starts with Operation Structure Definition (OSD) specifications for the service. OSD is a hierarchical declaration language with a lexical syntax somewhat similar to LISP. Fundamentally, OSD is a language for describing the logical structure of operation requests and replies. The structure declared within an OSD file directly maps to markup API calls described above. In other words, OSD is used to describe the interface to a set of operations (similar to the logical section of a WSDL description) and to introduce additional server-side authorization and validation logic.

Programmers will manually construct OSD files during development. They will then use OSDGen 1 during development to create skeleton server-side operation implementations (in, for example, C++ or Java), which they then manually populate with the code that handles executing the operation.

During build (when source code is translated to binary), OSDGen 1 is used to generate the entire service client API, as well as portions of the server-side code (the context classes). The generated code is generated and compiled in a single logical build step.

OSDGen 1 is not used at runtime. However, both the code generated by OSDGen 1 (the client API and the server-side operation context code) and the manually written server-side operation implementation are used.

The primary entities defined using OSD include:

service. This is the primary top-level entity in an OSD file. A service has a set of attributes (including name, version number, description, etc.) as well as a number of sub-entities. Sub-entities of service include itemdef, groupdef, faultdef, and operation.

itemdef. Itemdefs are used for defining simple types. In addition to a name, they have a corresponding markup type (e.g., string, integer, etc.) and a set of validation rules (min/max value, regular expression, etc.).

groupdef. Groupdefs are used for defining complex "struct"-style types. In addition to a name, they contain a combination of items and groups:

item. Items represent simple name/value pairs. In addition to a name, they have an associated itemdef or markup type, a cardinality clause, and a default value.

group. Groups represent complex name/value pairs. In addition to a name, they have an associated groupdef and a cardinality clause.

faultdef. Faultdefs are used for defining a service-specific fault that may be returned from an operation defined within the service. Faultdefs contain a name, a numeric code, and a message format string (similar to a printf string, but with argument names as well).

operation. Operations represent the individual tasks that a service can execute. Operations have a set of attributes (including name, version number, description, etc.) as well as sub-entities.

request. A request defines the structure of the information provided in a request for execution. Structurally, it is equivalent to a groupdef with no name.

reply. A reply defines the structure of the information provided in a reply provided with an operation execution. Structurally, it is equivalent to a groupdef with no name.

fault. This is used to identify that a particular fault (identified by faultdef name) may be returned by this operation.

OSD also supports the equivalent of the C pre-processor "#include" directive.

The most common organization of OSD files includes: a single top-level service file; a file that contains all the itemdef, groupdef, and faultdef definitions for the service; and a separate file for each operation.

Once OSD files exist, OSDGen 1 can be used to generate the following types of service-specific source files (based upon command-line options to OSDGen 1), server-side operation classes, server-side operation context classes, server-side service facility classes, client-side operation context code, and client-side support files:

Server-side operation classes. For each defined operation that does not have an associated C++ class, one will be generated for it. The generated classes inherit from the OipsOperation class and contain a method called execute( ). This method is invoked (with appropriate parameters) when execution is requested for that operation.

Server-side operation context classes. For each defined operation, a C++ context class will be generated. Operation context classes inherit from OipsOpCtxt and contain request and reply data for a particular instance of an operation execution and logic for serializing/deserializing operation request and reply data.

Server-side service facility classes. For each service, a small set of additional C++ classes are generated. These include a top-level class derived from OipsService (includes service-initialization and operation registration logic) as well as classes that define service-specific types and itemdef-specific validation logic.

Client-side operation context code. For each operation, a "struct" declaration and associated functions is generated. This code is designed to plug into the WCAF 2 and is similar to the server-side operation context classes, with the exception that it lacks the rich validation and version mapping logic found in the server-side classes and is written in C instead of C++.

Client-side support files. These files include both WSDL specifications for the service and fault message catalogs (in catgets format, to enable localization of fault messages).

2. OSD Details

OSD has a grammar that maps to the markup language structure. There are two types of "entries" in OSD: a "group" entry and an "item" entry. A group entry in OSD is depicted as:

(type "name" . . . )

An "item entry" in OSD is depicted as:

name "value"

The following main groups are defined within OSD: service, itemdef, item, groupdef, group, operation, which are characterized as follows:

service—used to define services. This is the highest-level construct in OSD. Everything else falls within a service definition, e.g.:

(service "smg"

. . .

)

itemdef—used to define types for items that will be contained in a request or reply, e.g.:

---

(itemdef "OipAuthToken"
    mtype "string" # markup type (string, int, or data)
    min_length "64"
    max_length "64")

item—an instance of an item, e.g.:

```
(item "authToken"
    type "OipAuthToken"
    card "1..1")
``` groupdef—used to define (complex) types for groups that will be contained in a request or reply, e.g.:

```
(groupdef "Subscriber"
    (item "id" type "SmgSubscriberId" card "1..1")
    (item "authToken" type "OipAuthToken" card "1..1")
    (group "attrs" type "Attribute" card "0..n")
)
``` group—used to define an instance of a group
operation—used to define an operation. Every operation must contain a "request" and a "reply" group:

```
(operation "AuthenticateSubscriber"
    (group "request"
        (group "lookupInfo"
            type "LookupInfo"
            desc "Information to find the subscriber."
            card "1..1")
        (group "authInfo"
            type "AuthInfo"
            desc "Information to authenticate the subscriber."
            card "1..1")
    )
    (group "reply"
        (item "id"
            type "SmgSubscriberID"
            card "1..1"
            write_ctxt "true"
            desc "Globally unique subscriber ID")
        (item "authToken"
            type "OipAuthToken"
            card "1..1"
            write_ctxt "true"
            desc "To be used with future requests.")
    )
)
```

Consider the following trivial example of a service that contains an operation for translating from a numerical digit to the corresponding English word (e.g., "1"> "one").

```
(service "digit"
    (itemdef "DigitWord"
        mtype "string"
        min_length "3"
        max_length "5")
    (itemdef "DigitSymbol"
        mtype "integer"
        min "0" max "9")
    (operation "ToWord"
        (group "request"
            (item "symbol" type "DigitSymbol" card "1..1"))
        (group "reply"
            (item "word" type "DigitWord" card "1..1"))
    )
)
```

On the client side, OSDGen 1 would produce the following set of C declarations:

```
struct DigitToWordRequest {
    int symbol;
};
struct DigitToWordReply {
    char* word;
};
struct DigitToWordOperation {
    OipcStatus (*requestToDoc)(
        OipcCall* call,
        const OipcOperation* op);
    OipcStatus (*docToReply)(
        OipcCall* call,
        OipcOperation* op);
    void (*cleanup)(
        OipcOperation* op);
    DigitToWordRequest request;
    DigitToWordReply reply;
};
``` extern void digitInitToWord(DigitToWordOperation*);

The following is an example of what the init and "requestToDoc" functions for DigitToWordOperation would look like:

```
void digitInitToWord(
    DigitToWordOperation* op)
{
    memset(op, 0, sizeof(DigitToWordOperation));
    op->cleanup = __DigitToWordCleanup;
    op->docToReply = __DigitToWordDocToReply;
    op->requestToDoc = __DigitToWordRequestToDoc;
}
static OipsStatus__DigitToWordRequestToDoc(
    OipcCall* call,
    const OipcOperation* op)
{
    const DigitToWordOperation* l_op = (const DigitToWordOperation*)op;
    const DigitToWordRequest* r = &l_op->request;
    oipmBeginGroup(&call->requestDoc, "digit_ToWord");
    oipmPutInt(&call->requestDoc, "symbol", r->symbol);
    oipmEndGroup(&call->requestDoc);
}
```

Server-Side Context:

If a reply item is marked with 'write_ctxt "true"', then the server will write the reply data for that item in two locations within the OipsCallCtxt object: 1) in the reply document (using the same oipm* functions displayed above for the client); and 2) in a context "map" maintained within the call context (see below). If a request item is marked with 'read_ctxt "true"', then a query for that item in the request will look in two places: 1) in the request document (via the appropriate oipmGet* function); and 2) if it is not found in the request document, then the context map is queried for the item.

This relationship between write_ctxt and read_ctxt is an important facet of the batching capabilities of the server, since it allows for a batch in circumstances that might normally require an additional round-trip. In particular, one can specify that reply (output) data from one operation in a batch be used as request data (input) for a later operation in the same batch. For example, consider the following:

Operation AuthUser
　request=user name and password
　reply=authentication token
Operation GetUserProfile
　request=authentication token
　reply=profile Marking the authentication token in the reply of AuthUser as 'write_ctxt "true"' and the authentication token in the request of GetUserProfile allows for both of these operations to be submitted as part of the same batch (essentially using output from AuthUser as input to GetUserProfile).

As an example of how OSDGen 1 parses OSD files, consider the following simple example OSD code fragment:

```
(groupdef "Person"
    (item "FirstName" mtype "string")
    (item "LastName" mtype "string")
    (item "Age" mtype "int" min "1" max "200")
)
(operation "PromoteEmployee"
    (request
        (group "person" type "Person"))
    . . .
)
```

The above OSD fragment says that a "PromoteEmployee" operation expects to have a "Person" identified in the request. OSDGen 1 parses these structural definitions and automatically generates the code that actually invokes the WSDK library API. So, for the above operation, client code would be automatically generated by OSDGen 1 to contain the following code fragment in the portion of the "PromoteEmployee" client API that is responsible for generating the request message:

. . .

oipmBeginGroup(odoc, "Person");
oipmPutString(odoc, "FirstName", request.FirstName);
oipmPutString(odoc, "LastName", request.LastName);
oipmPutString(odoc, "Age", request.Age);
oipmEndGroup(odoc);

. . .

VII. System Operation

A. System Initialization

System initialization begins with the initialization of server-level resources (logging, configuration, etc.) for a server instance, followed by discovery and dynamic loading of the set of services to be hosted within that server instance (during initialization, each service creates and registers a single instance of each operation class). The call manager, oipsCallMgr, is then initialized and created.

B. Document Exchange

Figure 7:
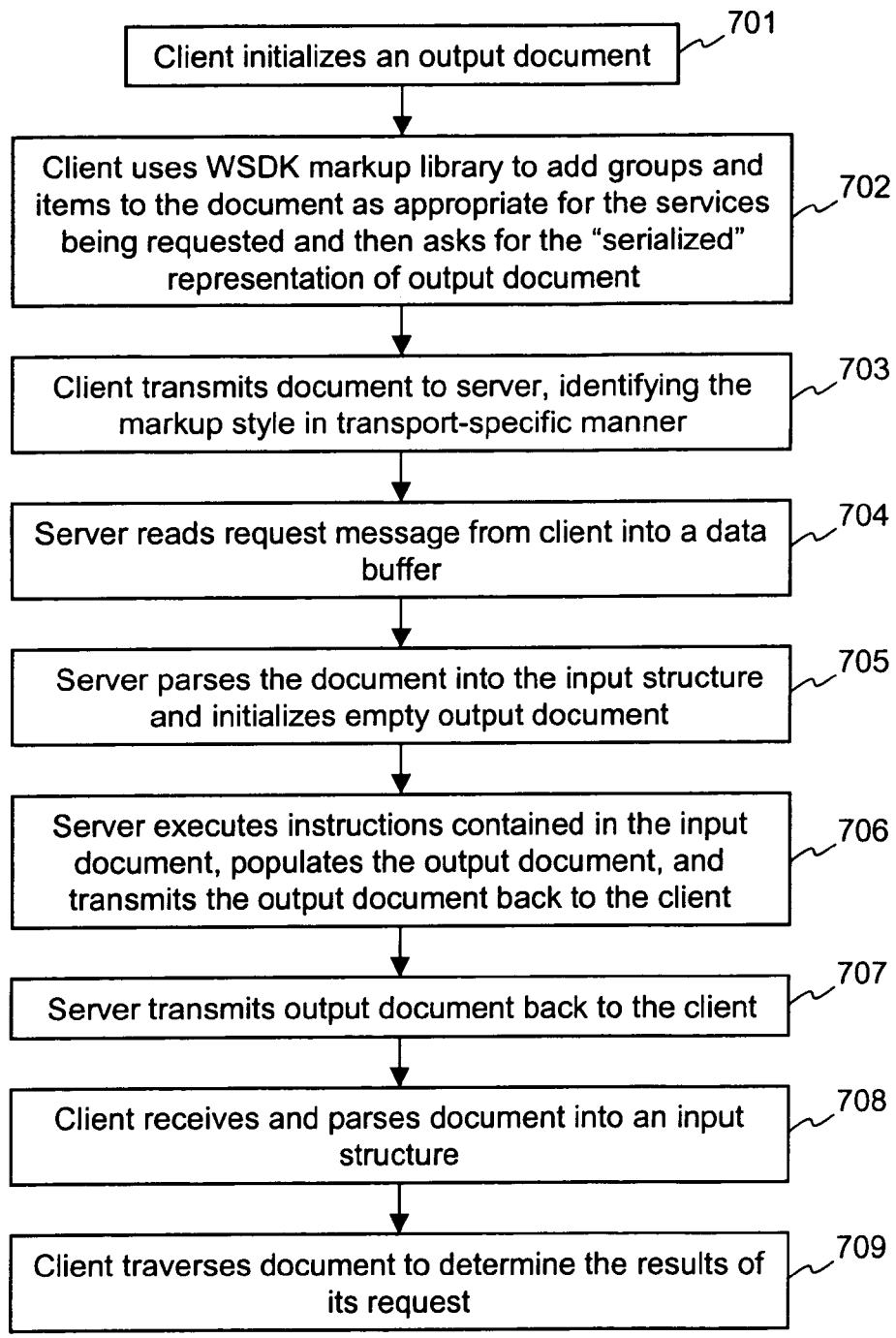
FIG. 7 shows an overall process for a document exchange between a client and a server using the WSDK APIs.

An example of a document exchange between client and server using the WSDK APIs is as follows, as illustrated in FIG. 7:

1. Client initializes an output document (block 701) by calling oipmInitOutputDoc, selecting the markup as appropriate for its performance and compatibility needs. For example, if a large volume of non-text data (e.g., .WAV or MP3 files) is to be sent, then the client might op to use a markup other than SOAP, which is not well-suited for such uses.

2. (Assuming use of the above APIs) Client uses the WSDK markup library 4 to add groups and items to the document as appropriate for the services being requested and then asks for the "serialized" representation of the output document (a data buffer containing the "on the wire" representation of the document) (block 702). This is done by making a number of calls to oipmPut*( ), oipmBeginGroup( ) and oipmEndGroup( ), as appropriate, followed by a call to oipmFinalizeOutput( ) (which allows the implementation to append any markup-specific trailer onto the buffer and returns the buffer).

3. Client transmits the document to the server (block 703), identifying the markup style in a transport-specific manner. For a typical case where the transport is via an HTTP POST, a URI is used to identify the markup style (e.g., URL is "http://host:port/oip/soap" or "http://host:port/oip/light").

4. Server reads the request message from client into a data buffer (from socket, file, Apache module API, etc.) (block 704).

5. Server invokes the markup library 4 to "parse" the document into the input structure (passing the appropriate markup style to the markup library 4) and initializes an empty output document in the same markup style in a data buffer (block 705). In this context, "parsing" includes: 1) parsing from text form into "input document" form, and 2) extracting data from the input document to build a native language structure.

6. Server invokes the handleCall method of oipsCallMgr to execute the instructions contained in the input document, to populate the output document (block 706).

7. Server transmits the output document back to the client, for example as the reply to the HTTP POST (block 707).

8. Client receives and parses the document into an input structure (using the markup library 4), passing in the original requested markup style (block 708).

9. Client traverses the document to determine the results of its request (block 709).

B. Client Operation

Figure 8:
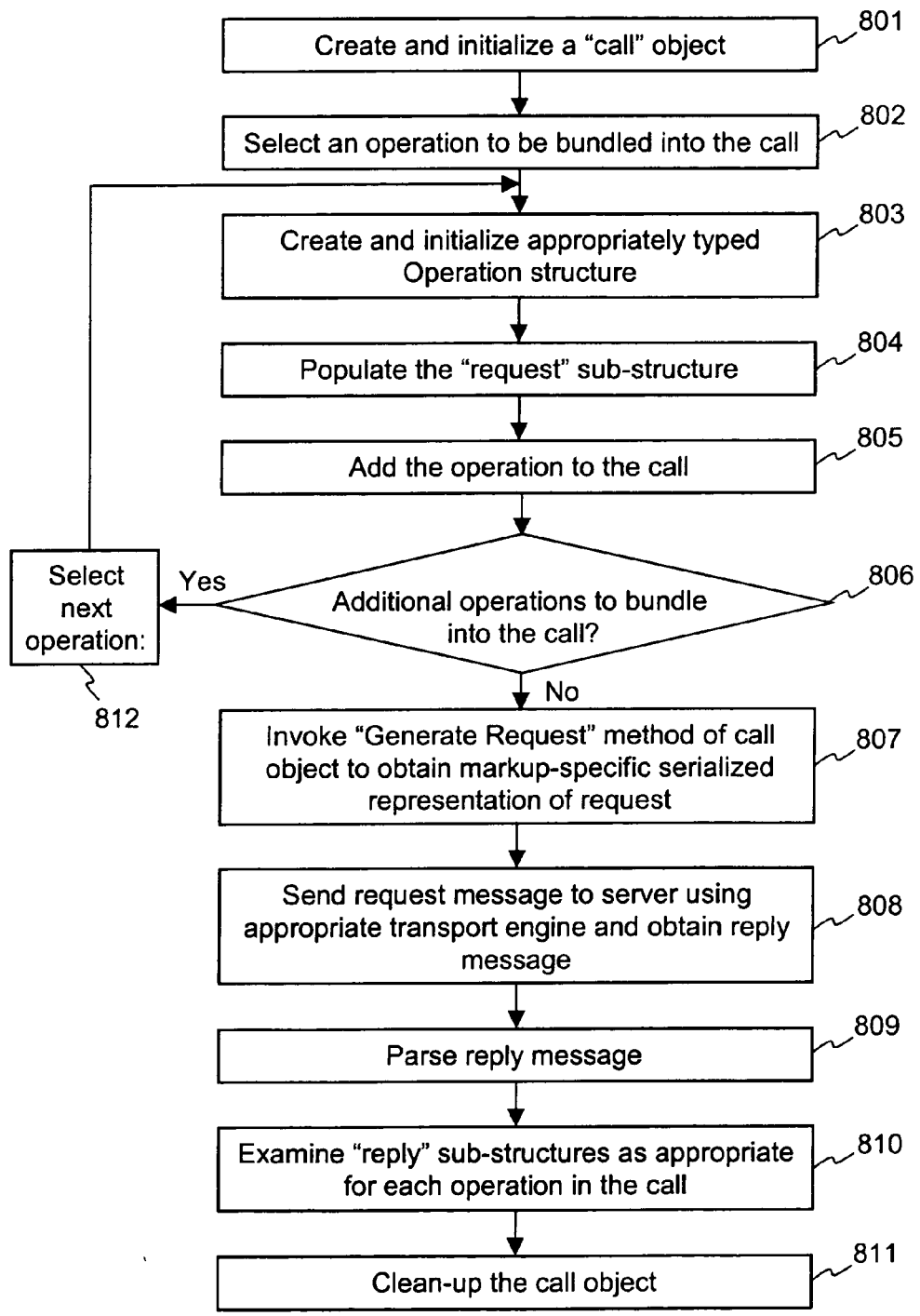
FIG. 8 shows a process performed by the client during the document exchange.

The actions performed by the client during a document exchange will now be described in greater detail, with reference to FIG. 8. The actions performed by the client are as follows:

1. Create and initialize a "call" object, specifying the markup style and error handling mode desired (block 801).

2. For each operation to bundle into the call (blocks 802, 806, 812):
　　a. Create and initialize an appropriately typed Operation structure (block 803).
　　b. Populate the "request" sub-structure (block 804).
　　c. Add the operation to the call (block 805).

3. Invoke the "Generate Request" method of the call object (call oipcGenerateRequest) to obtain the markup-specific serialized representation of the request (block 807).

4. Send the request message to the server using an appropriate transport engine and obtain the reply message (block 808).

5. Invoke the "Set Reply" method of the call object (call oipcSetReply) to parse the reply message (block 809).

6. Examine the "reply" sub-structures as appropriate for each of the operations in the call (block 810).

7. Clean-up the call object (block 811).

C. Server Operation

Figure 9A:
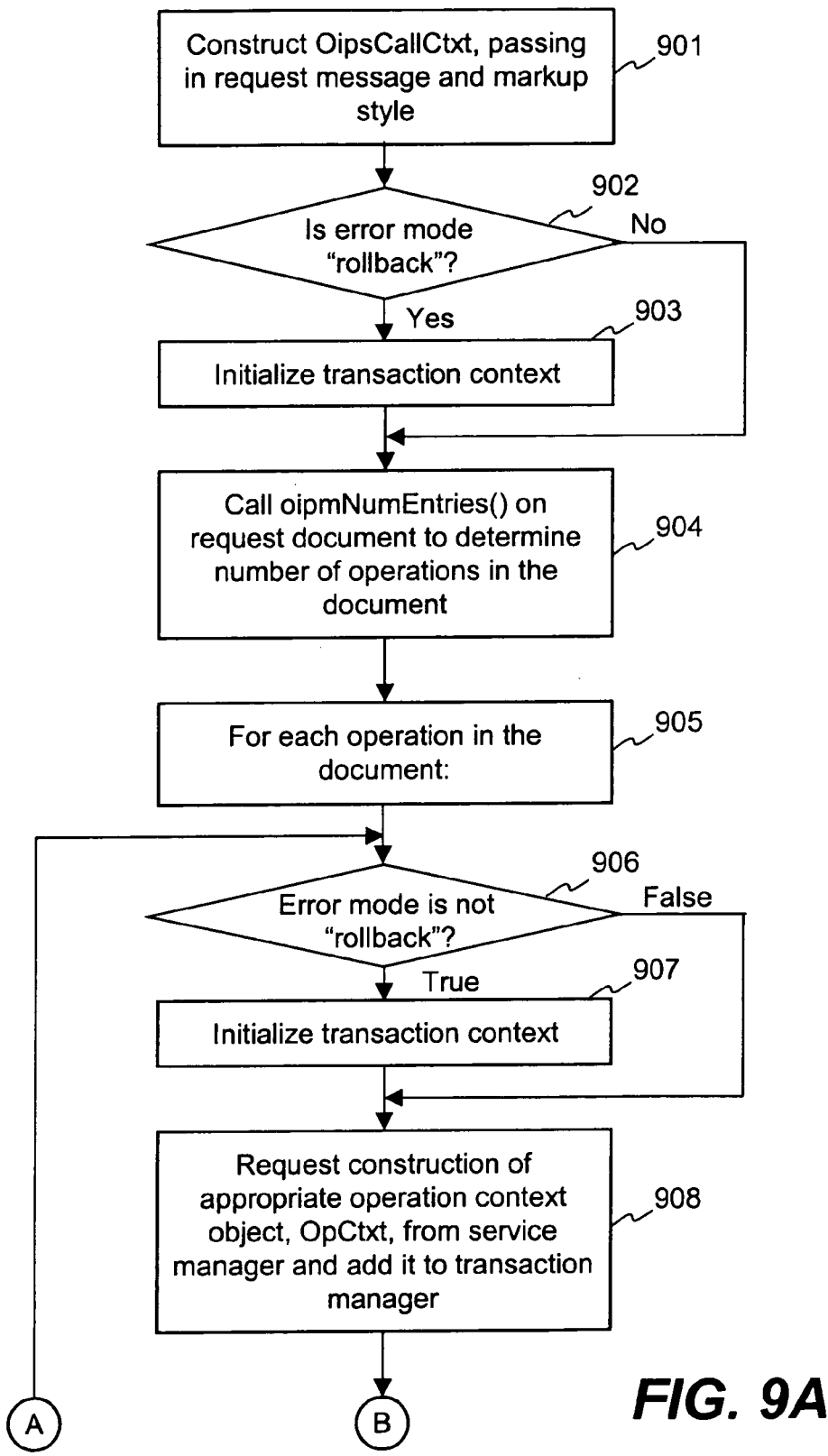
FIG. 9 shows a process performed by the server during the document exchange.
Figure 9B:
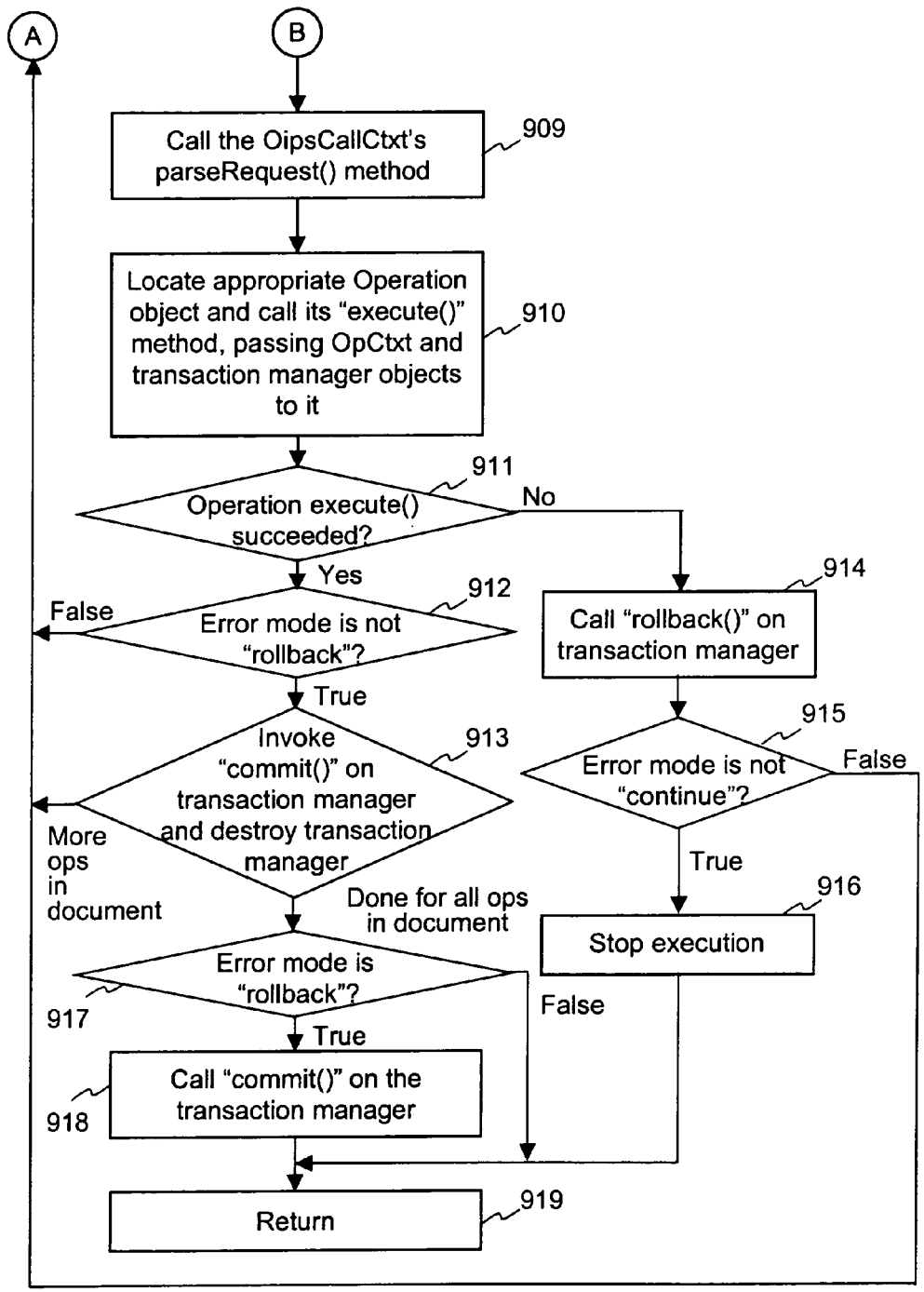

As discussed above, OipsCallMgr is the top-level manager of the call dispatch process on the server side. OipsCallMgr has a "handleCall" method, which is invoked by an underlying server framework. The handleCall method performs the following process, illustrated in FIG. 9, when a new request message is received:

1. Construct a call context, OipsCallCtxt, passing in the request message and the markup style (block 901).

2. If the error mode is "rollback" (block 902), initialize the transaction context (block 903).

3. Call oipmNumEntries( ) on the OipsCallCtxt's request document to find out how many operations exist in the document (block 904).

4. For each operation in the document (blocks 905–916):
  a. If the error mode is not "rollback" (block 906), initialize the transaction context (block 907).
  b. Request construction of the appropriate operation context object, OpCtxt, from the service manager and add it to the transaction manager (block 908).
    Service manager reads the service name from the request and asks the corresponding service for the context.
      The service reads the operation name from the request and asks the corresponding operation object for the context.
        The operation object constructs and returns an appropriately typed operation context object.
  c. Call the operation context's parseRequest( ) method (block 909).
    The operation context object uses OipsCallCtxt to find and validate the appropriate groups and items and populates "request" structure (data is not copied into request structure—only pointers).
  d. Find the appropriate Operation object and call its "execute( )" method, passing the OpCtxt and transaction manager objects to it (block 910).
  e. If the operation execute( ) succeeds (block 911), and if the error mode is not "rollback" (block 912), invoke "commit( )" on the transaction manager (which will write the reply and invoke commit on anything the operation may have added to the transaction manager) and destroy the transaction manager (block 913).
  f. If the operation execute( ) fails (block 911), then:
    Call "rollback( )" on the transaction manager (block 914). This will call "rollback( )" on anything contained within the transaction manager (and will write error messages as the replies for any OpCtxt objects).
    If the error mode is not "continue" (block 915), stop execution (block 916) and return (block 919).

5. If the error mode is "rollback" (block 917), call "commit( )" on the transaction manager (see 4*e*) (block 918).

VIII. Processing System Implementation

Figure 10:
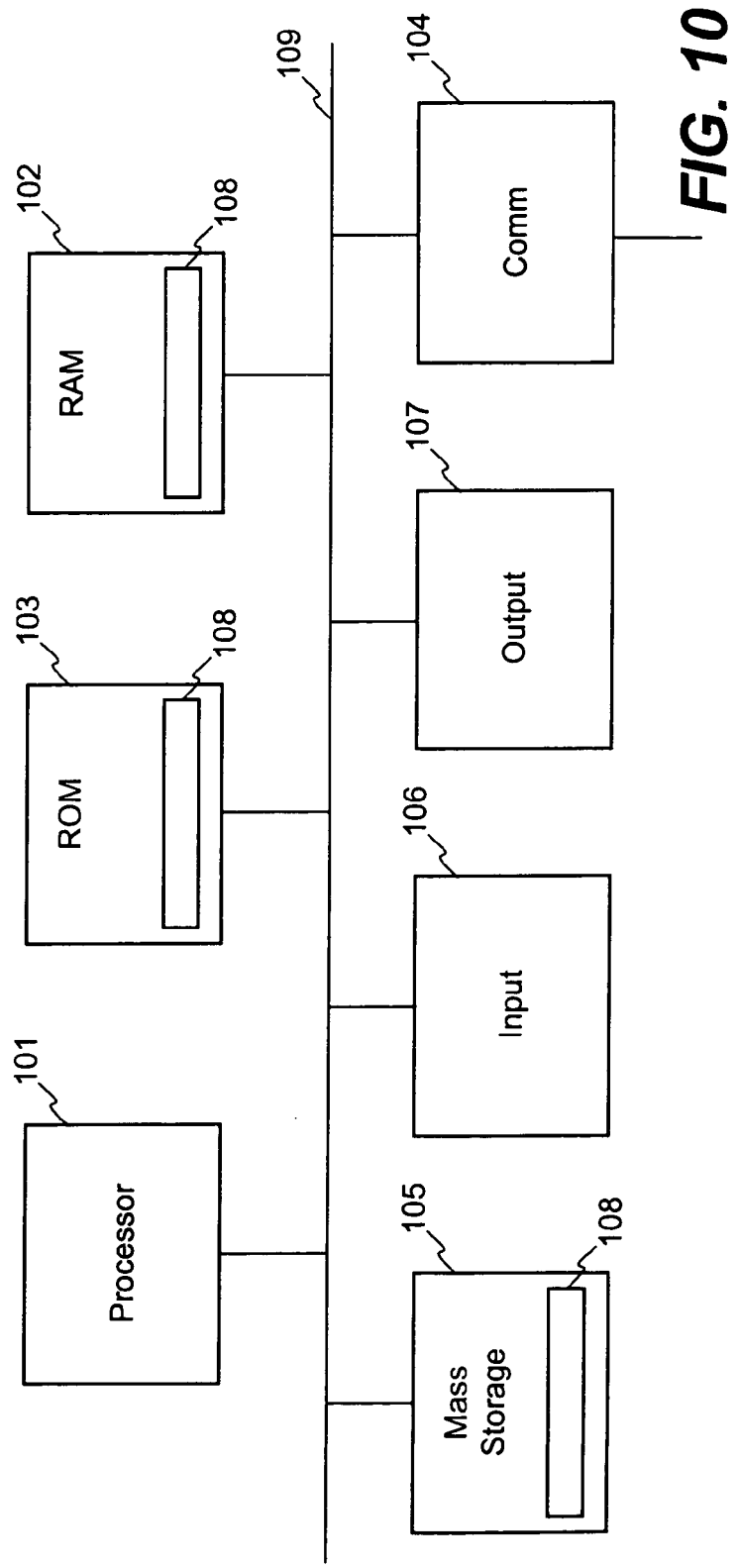
FIG. 10 is a block diagram showing an abstraction of a processing system that can be used to implement the WSDK and related techniques.

The techniques described above may be implemented in one or more processing systems using software executed by one or more conventional processors, or using special-purpose hardwired circuitry, or a combination thereof. FIG. 10 is a high-level block diagram showing an example of a processing system that can be used to implement the described techniques. Note that a variety of specific architectures can be represented by FIG. 10.

The illustrated system includes one or more processors 101, i.e. a central processing unit (CPU), random access memory (RAM) 102, read-only memory (ROM) 103, and, which may be coupled to each other by a bus system 109. The processor(s) 101 may be, or may include, one or more programmable general-purpose or special-purpose microprocessors, digital signal processors (DSPs), programmable controllers, application specific integrated circuits (ASICs), programmable logic devices (PLDs), or a combination of such devices.

The bus system 109 includes one or more buses or other connections, which may be connected to each other through various bridges, controllers and/or adapters, such as are well-known in the art. For example, the bus system 109 may include a "system bus", which may be connected through one or more adapters to one or more expansion buses, such as a Peripheral Component Interconnect (PCI) bus, Hyper-Transport or industry standard architecture (ISA) bus, small computer system interface (SCSI) bus, universal serial bus (USB), or Institute of Electrical and Electronics Engineers (IEEE) standard 1394 bus (sometimes referred to as "Firewire").

Also coupled to the bus system 109 are one or more data communication devices 104, one or more mass storage devices 105, one or more input devices 106 and one or more output devices 1010. The input devices 106 may include, for example, a keyboard and a pointing device. The output devices 1010 may include, for example, a display device and an audio speaker. Of course, such devices are unnecessary on a server if the server is not intended to directly interface with a user or operator. It will be understood that the processing system may also include other conventional components that are not shown.

Each data communication device 44 is a device suitable for enabling the processing system to communicate with remote devices and may be, for example, a conventional modem, a Digital Subscriber Line (DSL) modem, a cable modem, an Ethernet adapter, an Integrated Services Digital Network (ISDN) adapter, a satellite transceiver, a wireless transceiver (e.g., in the case of a mobile device), or the like. Each mass storage device 105 may include any one or more storage media suitable for storing large volumes of data in a non-volatile manner, such as a magnetic disk or tape, magneto-optical (MO) storage device, or any of various forms of Digital Versatile Disk (DVD) or Compact Disk (CD) based storage, or a combination thereof.

The processes described above may be implemented using a combination of instructions and data 108 stored in a storage medium, which may be, for example, any of RAM 102, mass storage device 105 and/or ROM 103, as shown, or on a remote processing system.

Thus, a method and apparatus for developing web services that employ a standard logical interface to support multiple markup implementations have been described. Although the present invention has been described with reference to specific exemplary embodiments, it will be recognized that the invention is not limited to the embodi-

What is claimed is:

1. A method comprising:
receiving from a client a markup language independent request, the request specifying a logical structure representing a set of operations which a server is to be requested to perform on behalf of the client;
receiving from the client an indication of one of a plurality of selectable markup languages; and
generating a markup language encoding of the request in one of the selectable markup languages according to the indication, without using any explicitly declared binding of logical structure to markup language encoding.

2. A method as recited in claim 1, wherein said generating comprises:
using a library that comprises a plurality of markup language implementations, each corresponding to a different one of the plurality of selectable markup languages; and
using one of the markup language implementations corresponding to said one of the plurality of selectable markup languages, to generate the markup language encoding.

3. A method as recited in claim 2, wherein the library is not dependent upon any particular markup language encoding or upon any logical representation of any markup language encoding.

4. A method as recited in claim 2, wherein the library is configured to provide a binding between logical structure and markup language encoding for all possible operations in each of the plurality of selectable markup languages.

5. A method as recited in claim 1, further comprising providing the markup language encoding to the client as a markup language encoded request.

6. A method as recited in claim 1, further comprising:
receiving from the server a markup language document specifying the set of operations after the server has received the markup language encoded request;
generating, based on the markup language document, a logical structure representing the set of operations, wherein the logical structure is not specific to any markup language, without using any explicitly declared binding of logical structure to markup language encoding; and
providing the logical structure to the server, for use by the server to perform the set of operations.

7. A method comprising:
receiving a markup language document specifying a set of operations to be performed by a server for a client; and
generating, based on the markup language document, a logical structure representing the set of operations, wherein the logical structure is not specific to any markup language, without using any explicitly declared binding of logical structure to markup language encoding, the logical structure for use by the server to perform the set of operations.

8. A method as recited in claim 7, wherein said receiving comprises receiving the markup language document from the server after the server has received a request for said operations from the client, the method further comprising providing the logical structure to the server, for use by the server to execute the set of operations.

9. A method as recited in claim 8, wherein said generating comprises:
using a library that comprises a plurality of markup language implementations, each corresponding to a different one of a plurality of markup languages; and
using one of the markup language implementations corresponding to said markup language to generate the logical structure.

10. A method as recited in claim 8, wherein the library is not dependent upon any particular markup language encoding or upon any logical representation of any markup language encoding.

11. A method as recited in claim 8, wherein the library is configured to provide a binding between logical structure and markup language encoding for all possible operations in each of the plurality of selectable markup languages.

12. A method as recited in claim 11, further comprising automatically selecting one of the markup language implementations for use, based on the request.

13. A method comprising:
receiving at a server a markup language document originating from a client, the markup language document specifying a set of operations to be performed by the server for the client;
accessing a library that comprises a plurality of software modules, each corresponding to a different one of a plurality of markup languages;
automatically selecting one of the software modules based on the markup language document;
using the selected one of the software modules to generate a logical structure representing the set of operations based on the markup language document, wherein the logical structure is not specific to any markup language, without using any explicitly declared binding of logical structure to markup language encoding; and
providing the logical structure to the server, for use by an application on the server to execute the set of operations according to the logical structure, wherein the application is not specific to any markup language.

14. A method as recited in claim 13, wherein the library is for use by both the client and the server.

15. A method as recited in claim 14, wherein the library is not dependent upon any particular markup language encoding or upon any logical representation of any markup language encoding.

16. A method as recited in claim 14, wherein the library is configured to provide a binding between logical structure and markup language encoding for all possible operations in each of the plurality of selectable markup languages.

17. A method as recited in claim 16, further comprising automatically selecting one of the markup language implementations for use, based on the markup language document.

18. An apparatus comprising:
a plurality of software modules, each corresponding to a different one of a plurality of markup languages, each to convert between a generic data format and a markup language-specific data format;
means for using a selected one of the software modules to convert between a markup language encoding of a logical structure and a representation of the logic structure that is not specific to any markup language, without using any explicitly declared binding of logical structure to markup language encoding, the logical structure defining a set of operations for a web based application involving a client and a server;

means for receiving from a client an indication of one of the plurality of markup languages; and means for generating a markup language encoding of a request in one of the plurality of markup languages according to the indication, without using any explicitly declared binding of logical structure to markup language encoding.

19. A processing system comprising:

a processor; and a storage facility coupled to the processor, the storage facility storing a program accessible to a client and a server in a web based network environment, the program having the ability, when invoked by the client or the server, to convert between a logical structure that is not specific to any markup language and a markup language encoding of the logical structure, for any of a plurality of markup languages, without using any explicitly-declared binding of logical structure to markup language encoding, the logical structure defining a set of operations for a web based application involving the client and the server.

20. A method comprising:

receiving at a server a first markup language document from a client over a network, the first markup language document comprising a markup language encoding of a request for a set of operations to be performed at the server;

operating the server to parse the first markup language document into a logical structure specifying the set of operations, wherein the logical structure is not specific to any markup language, without using any explicitly declared binding of logical structure to markup language encoding;

executing the set of operations at the server by using the logical structure;

populating a second markup language document with a result of executing the set of operations; and sending the second markup language document from the server to the client over the network as a response to the request.

21. A method as recited in claim 20, wherein said operating comprises using a library accessible to both the server and the client, wherein the library has the ability, when invoked by a processing system, to convert between a logical structure that is not specific to any markup language and a markup language representation of the logical structure, for any of a plurality of markup languages.

22. A method as recited in claim 21, wherein the library comprises a plurality of software modules, each corresponding to a different one of a plurality of markup languages, and wherein said operating the server to parse the first markup language document comprises using one of the software modules corresponding to said markup language.

23. A method as recited in claim 21, further comprising automatically identifying in which of a plurality of markup languages the first markup language document is encoded and selecting said one of the software modules accordingly.

24. A method as recited in claim 21, wherein the first markup language document further includes an indicator indicating the markup language, and wherein said operating the server to parse the first markup language document comprises selecting said one of the software modules for use, based on the indicator.

25. A method as recited in claim 21, wherein the library is not dependent upon any particular markup language encoding or upon any logical representation of any markup language encoding.

26. A method for a client to obtain a service from a remote server over a network, the method comprising:

operating the client to provide, to a library, a logical representation of a request for the service and an indication of one of a plurality of selectable markup languages, wherein the logical representation is not specific to any markup language;

receiving from the library a markup language encoding of the request in a markup language specified by said indication;

sending a request in the form of a first markup language document including the markup language encoding to the server over the network; and receiving a second markup language document from the server over the network in response to the request, the second markup language document being a result of said service.

27. A method as recited in claim 26, further comprising operating the client to dynamically select said one of the plurality of selectable markup languages for encoding of the request.

28. A method as recited in claim 26, wherein the library is for use by both the client and the server.

29. A method as recited in claim 28, wherein the library is not dependent upon any particular markup language encoding or upon any logical representation of any markup language encoding.

* * * * *